US 9,275,333 B2

(12) United States Patent
Santos et al.

(10) Patent No.: US 9,275,333 B2
(45) Date of Patent: Mar. 1, 2016

(54) AUGMENTED KNOWLEDGE BASE AND REASONING WITH UNCERTAINTIES AND/OR INCOMPLETENESS

(71) Applicants: Eugene S. Santos, Canfield, OH (US);
Eunice E. Santos, Canfield, OH (US);
Evelyn W. Santos, Canfield, OH (US);
Eugene Santos, Jr., Canfield, OH (US)

(72) Inventors: Eugene S. Santos, Canfield, OH (US);
Eunice E. Santos, Canfield, OH (US);
Evelyn W. Santos, Canfield, OH (US);
Eugene Santos, Jr., Canfield, OH (US)

( * ) Notice: Subject to any disclaimer, the term of this patent is extended or adjusted under 35 U.S.C. 154(b) by 192 days.

(21) Appl. No.: 13/836,637

(22) Filed: Mar. 15, 2013

(65) Prior Publication Data
US 2013/0304675 A1    Nov. 14, 2013

Related U.S. Application Data

(60) Provisional application No. 61/645,241, filed on May 10, 2012.

(51) Int. Cl.
| | |
|---|---|
| *G06N 5/00* | (2006.01) |
| *G06F 1/00* | (2006.01) |
| *G06N 5/02* | (2006.01) |
| *G06N 5/04* | (2006.01) |

(52) U.S. Cl.
CPC . *G06N 5/02* (2013.01); *G06N 5/048* (2013.01)

(58) Field of Classification Search
CPC ............ G06N 5/02; G06N 5/04; G06Q 10/00
See application file for complete search history.

(56) References Cited

U.S. PATENT DOCUMENTS

| | | | |
|---|---|---|---|
| 5,355,445 A | 10/1994 | Shibao et al. | |
| 5,402,526 A | 3/1995 | Bauman et al. | |
| 7,421,419 B2 | 9/2008 | Maren | |
| 2004/0019575 A1* | 1/2004 | Talbot et al. | 706/46 |
| 2007/0005523 A1 | 1/2007 | Maren | |
| 2007/0156720 A1 | 7/2007 | Maren | |
| 2008/0021912 A1 | 1/2008 | Seligman et al. | |
| 2009/0271358 A1 | 10/2009 | Lindahl et al. | |
| 2013/0173249 A1* | 7/2013 | Eggebraaten et al. | 704/9 |
| 2013/0304675 A1 | 11/2013 | Santos et al. | |

OTHER PUBLICATIONS

"*Rule-Based Expert Systems*"; Bruce G. Buchanan, Edward H. Shortliffe, Addison Wesley, 1984 (1 book).
"*Inductive Reasoning: Experimental, Developmental, and Computational Approaches*"; Aidan Feeney, Evan Heit, Cambridge University Press, 2007 (1 book).
"*Belief Revision, Cambridge Tracts in Theoretic Computer Science*"; vol. 29, Peter Gardenfors, International Cambridge University Press, 2003.
"*Induction: Process of Inference, Learning, and Discovery*"; John H. Holland, Keith J. Holyoak, Richard E. Nisbett, Paul R. Thaggard, MIT Press, 1989 (1 book).

(Continued)

*Primary Examiner* — Jeffrey A Gaffin
*Assistant Examiner* — Kalpana Bharadwaj
(74) *Attorney, Agent, or Firm* — Staas & Halsey LLP

(57) ABSTRACT

A knowledge-based system under uncertainties and/or incompleteness, referred to as augmented knowledge base (AKB) is provided, including constructing, reasoning, analyzing and applying AKBs by creating objects in the form $E \rightarrow A$, where A is a rule in a knowledgebase and E is a set of evidences that supports the rule A. A reasoning scheme under uncertainties and/or incompleteness is provided as augmented reasoning (AR).

18 Claims, 16 Drawing Sheets

(56) References Cited

OTHER PUBLICATIONS

"*Probabilistic Reasoning in Intelligent Systems: Networks of Plausible Inference*"; Judea Pearl, Morgan Kaufmann, 1988 (1 book).

"*Causality: Models, Reasoning, and Inference*"; Judea Pearl, Cambridge University Press, 2000 (1 book).

"*A Mathematical Theory of Evidence*"; G. Shafer, Princeton University Press, 1976 (1 book).

"*Fuzzy Logic for the Management of Uncertainty*"; Lotfi A. Zadeh, Janusz Kacprzyk, John Wiley, 1992 (1 book).

"*Computing with Words in Information/intelligent Systems 1*"; Lotfi A. Zadeh, Janusz Kacprzyk, Physica-Verlag, 1999 (1 book).

"*Database Systems: The Complete Book*"; Hector Garcia-Molina, Jeff Ullman, Jennifer Widom, Prentice-Hall, 2002. (1 book).

"*Fuzzy Sets*"; L.A. Zadeh; Department of Electrical Engineering and Electronics Research Laboratory, University of California, Berkeley, California; 1965; pp. 338-353.

"*The Role of Fuzzy Logic in the Management of Uncertainty in Expert Systems*"; L.A. Zadeh; Computer Science Division, Department of EECS and ERL, University of California, Berkeley; Fuzzy Sets and Systems 11 (1983) pp. 199-227.

"*Toward a generalized theory of uncertainty (GTU)—an outline*"; Lotfi A. Zadeh; Berkeley initiative in Soft Computing (BISC), Computer Science Division and the Electronics Research Laboratory, Department of EECS, University of California, Berkeley, CA; Information Sciences 172 (2005) pp. 1-40.

"*Review of Books: A Mathematical Theory of Evidence*"; Lotfi A. Zadeh; AI Magazine vol. 5, No. 3 (1984); pp. 81-83.

"*A Simple View of the Dempster-Shafer Theory of Evidence and its Implication for the Rule of Combination*"; Lotfi A. Zadeh; Computer Science Division, University of California, Berkeley, California; AI Magazine vol. 7 No. 2 (1986); pp. 85-90.

"*A framework for building knowledge-bases under uncertainty*"; Eugene Santos Jr. and Eugene S. Santos; Journal of Experimental & Theoretical Artificial Intelligence 11 (1999) pp. 265-286.

"*Implicitly preserving semantics during incremental knowledge base acquisition under uncertainty*"; Eugene Santos Jr., Eugene S. Santos, and Solomon Eyal Shimony; Dec. 1, 2001; International Journal of Approximate Reasoning 33 (2007) pp. 71-94.

"*Using Approximate Reasoning to Represent Default Knowledge*"; Ronald R. Yager; Artificial Intelligence 31 (1987); pp. 99-112.

"*Probabilistic Logic*"; Nils J. Nilsson; Computer Science Department, Stanford University, Stanford, CA; Artificial Intelligence 28 (1986); pp. 71-87.

"*Reasoning with Uncertainty in Deductive Databases and Logic Programs*"; Raymond T. Ng; Department of Computer Science, University of British Columbia, Vancouver, B.C.; International Journal of Uncertainty, Fuzziness and Knowledge-Based Systems vol. 5, No. 3 (1997); pp. 261-316.

"*Imprecision and incompleteness in relational databases: survey*"; A. Motro; Computer Science Department, University of Southern California, Los Angeles, CA; Information and Software Technology vol. 32 , No. 9, Nov. 1990; pp. 579-588.

"*Constructing Probabilistic ATMS Using Extended Incidence Calculus*"; Weiru Liu, Alan Bundy; Department of Artificial Intelligence, University of Edinburgh, Edinburgh, U.K.; International Journal of Approximate Reasoning 1994 11:1-158; pp. 1-37.

"*An Extended Relational Database Model for Uncertain and Imprecise Information*"; Suk Kyoon Lee; Department of Computer Science, University of Iowa, Iowa City, IA; Proceedings of the 18$^{th}$ VLDB Conference Vancouver, British Columbia, Canada 1992; pp. 211-220.

"*Reasoning with Uncertainty in a Knowledge Based System*"; Eugene S. Santos, Eugene Santos Jr.; 0195-623X/87/0000/0075$01.00 1987 IEEE; pp. 75-81.

"*A Normal Form for Relational Databases that is Based on Domains and Keys*"; Ronald Fagin; IBM Research Library; ACM Transactions on Database Systems, vol. 6, No. 3, Sep. 1981, pp. 387-415.

"*An Assumption-based TMS*"; Johan de Kleer; Intelligent Systems Laboratory, Xerox Palo Alto Research Center; Artificial Intelligence 28 (1986); pp. 127-162.

"*Incidence Calculus: A Mechanism for Probabilistic Reasoning*"; Alan Bundy; Department of Artificial Intelligence, University of Edinburgh; Journal of Automated Reasoning 1 (1985) 0168-7433/85.15 pp. 263-283.

PCT/ISA/237 Written Opinion dated Nov. 7, 2013 in corresponding International Patent Application No. PCT/US2013/040317; (42 pages).

Forms PCT/IPEA/416 and PCT/IPEA/409, International Preliminary Report on Patentability, mailed Jun. 24, 2014 in corresponding International Application No. PCT/US2013/040317 (62 pages).

Form PCT/ISA 220 and Form PCT/ISA/210, International Search Report mailed Nov. 26, 2013 in corresponding International Application No. PCT/US2013/040317 (4 pages).

Minker. *An Overview of Nonmonotonic Reasoning and Logic Programming*. The Journal of Logic Programming, vol. 17. 1993. pp. 95-126. [retrieved on Nov. 7, 2013]. Retrieved from the Internet:URL:http://www.sciencedirect.com/science/article/pii/074310669390028F/
pdf?md5=065d470a65f0c545f5d7aac037fc2332&pid=1-s2.
074310669390028F-main.pdf. entire document.

L.A. Zadeh. "*On the Validity of Dempster's Rule of Combination of Evidence*"; Memorandum No. UCB/ERL M79/24, Mar. 21, 1979; Electronics Research Laboratory, College of Engineering University of California, Berkeley, CA 94720 (pp. 1-12).

\* cited by examiner

SAMPLE AKB ENTRIES

| EVIDENCE (E) | RULES (L) | EVIDENCE (E) | WEIGHT | SOURCE | CONSTRAINTS |
|---|---|---|---|---|---|
| E101 | WATER pH LEVEL LESS THAN 6.0. | E101 | 0.0014 | EXPERT/PROFESSIONAL PUBLICATIONS | E101, E102, E103, E104, E105 IS A PARTITION OF THE UNIVERSAL SET |
| E102 | WATER pH LEVEL IS (6.0 - 7.0). | E102 | 0.1930 | EXPERT/PROFESSIONAL PUBLICATIONS | |
| E103 | WATER pH LEVEL IS 7.0. | E103 | 0.1334 | EXPERT/PROFESSIONAL PUBLICATIONS | |
| E104 | WATER pH LEVEL IS (7.0 - 9.0). | E104 | 0.6722 | EXPERT/PROFESSIONAL PUBLICATIONS | |
| E105 | WATER pH LEVEL IS MORE THAN 9.0. | E105 | 0.0006 | EXPERT/PROFESSIONAL PUBLICATIONS | |
| E106 | WATER pH LEVEL IS (7.0 - 7.2). | E106 | 0.2976 | EXPERT/PROFESSIONAL PUBLICATIONS | E106 IS A SUBSET OF E104 |
| E107 | WATER pH LEVEL IS (7.2 - 7.4). | E107 | 0.1334 | EXPERT/PROFESSIONAL PUBLICATIONS | E107 IS A SUBSET OF E104 |
| E121 | WATER CONDITION IS ACIDIC WHEN WATER pH LEVEL IS LESS THAN 6.0 OR (6.0 - 7.0). | E121 | 1.0000 | EXPERT/PROFESSIONAL PUBLICATIONS | |
| E122 | WATER CONDITION IS ALKALINE WHEN WATER pH LEVEL IS GREATER THAN 9.0 OR (7.0 - 9.0). | E122 | 1.0000 | EXPERT/PROFESSIONAL PUBLICATIONS | |
| E123 | WATER CONDITION IS NEUTRAL WHEN WATER pH LEVEL IS 7.0. | E123 | 1.0000 | EXPERT/PROFESSIONAL PUBLICATIONS | |
| E121' | WATER CONDITION IS ACIDIC WHEN WATER pH LEVEL IS GREATER THAN 7.0. | | | | |
| E122' | WATER CONDITION IS ALKALINE WHEN WATER pH LEVEL IS LESS THAN 7.0. | | | | |
| E131 | FISH COLOR IS DISCOLORED - YELLOWISH WHEN WATER CONDITION IS NEUTRAL AND THE DISEASE OF VELVET IS TRUE. | E131 | 0.4194 | EXPERT/PROFESSIONAL PUBLICATIONS | E131 AND E132 ARE DISJOINT |
| E132 | FISH COLOR IS DISCOLORED - YELLOWISH WHEN WATER CONDITION IS ACIDIC AND THE DISEASE OF VELVET IS TRUE. | E132 | 0.3681 | EXPERT/PROFESSIONAL PUBLICATIONS | |
| E133 | FISH COLOR IS DISCOLORED - YELLOWISH WHEN WATER CONDITION IS ACIDIC AND THE DISEASE OF VELVET IS FALSE. | E133 | 0.3028 | EXPERT/PROFESSIONAL PUBLICATIONS | E133 AND E134 ARE DISJOINT |
| E134 | FISH COLOR IS DISCOLORED - YELLOWISH WHEN WATER CONDITION IS ALKALINE AND THE DISEASE OF VELVET IS TRUE. | E134 | 0.2376 | EXPERT/PROFESSIONAL PUBLICATIONS | |

FIG. 2

EXAMPLE OF UNIFICATION ALGORITHMS

ALGORITHM A.4 (UNIFICATION ALGORITHM) GIVEN A IRREDUCIBLE AKB $\kappa$

1. Do while there exists an unmarked pair $(\omega_1, \omega_2)$, where $\omega_1, \omega_2 \in \kappa$ and $\omega_1 \sim \omega_2$:

(a) Let $\mathcal{K} = \Gamma\ (\mathcal{K}, \omega_1 \diamondsuit \omega_2)$.

(b) Mark $(\omega_1, \omega_2)$.

2. Let $\mathcal{G} = \{G \subseteq U \mid (G \rightarrow F) \in \kappa\}$. If $\mathcal{G} \neq \emptyset$, then return $\cup_{G \in \mathcal{G}}\ G$. Otherwise, return $\emptyset$.

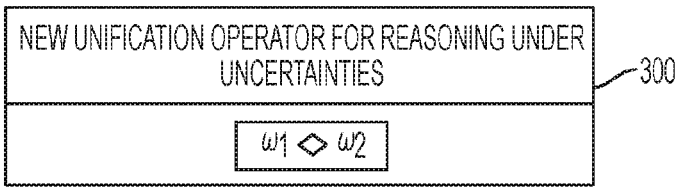

NEW UNIFICATION OPERATOR FOR REASONING UNDER UNCERTAINTIES —300

$\omega_1 \diamondsuit \omega_2$

FIG. 4

MEASURE : FUNCTIONS OR MAPPINGS REPRESENTING THE STRENGTH OR VALIDITY OF A BODY OF EVIDENCE

- Let $\varepsilon \subseteq 2^U$. A measure $m$ over $\varepsilon$ is a function from $\varepsilon$ into a linear ordered set, such that for all $E_1, E_2 \in \varepsilon, m(E_1) \leq m(E_2)$ whenever $E_1 \subseteq E_2$.

- Let $\varepsilon \subseteq 2^U$. A *probability measure* $m$ over $\varepsilon$ is a function from $\varepsilon \cup \{\emptyset, U\}$ into $[0, 1]$, the close unit interval, which satisfies the following conditions:

1. $m(\emptyset) = 0$ and $m(U) = 1$.
    2. $m(E_0) \geq m(E_1) + m(E_2)$ for all $E_0, E_1, E_2, \in \varepsilon$ where $E_1 \cap E_2 = \emptyset$ and $E_1, E_2 \subseteq E_0$.
    3. $m(E_1 \cup E_2) \leq m(E_1) + m(E_2)$ for all $E_1, E_2 \in \varepsilon$ where $E_1 \cup E_2 \in \varepsilon$.

- Let $\kappa$ be an AKB. $m$ is a *(probability) $\kappa$-measure* if and only if $m$ is a (probability) measure over $\varepsilon_\kappa$, the collection of all sets (body of evidence) given in an AKB.

FIG. 5

BASIC PROPERTIES OF AKB
METHOD FOR TESTING AND ENSURING THE PROPERTIES

1. $\mathcal{K}$ is *consistent* if and only if $G = \emptyset$, subject to $C_\mathcal{K}$, whenever $G \xrightarrow{d}_\mathcal{K} F$ 2. $\mathcal{K}$ is *complete* if and only if for every $L \in \mathcal{L}$, $\underline{\sigma}_\mathcal{K}(L) = \subseteq \sigma_\mathcal{K}(L)$ 3. $\mathcal{K}$ is *perfect* if and only if for every $L \in \mathcal{L}$, $\underline{\sigma}_\mathcal{K}(L) = \sigma_\mathcal{K}(L)$ 4. $\mathcal{K}$ is *i-consistent* if and only if $G = U$, subject to $C_\mathcal{K}$, whenever $G \xrightarrow{i}_\mathcal{K} T$ 5. $\mathcal{K}$ is *monotonic* if and only if for every $\omega_1, \omega_2 \in \hat{\mathcal{K}}$, if $r(\omega_1) \Rightarrow r(\omega_2)$, then $I(\omega_1) \subseteq I(\omega_2)$ 6. $\psi_\mathcal{K}(\lambda, L) = \tilde{m}(\sigma_\mathcal{K}(L)) - \tilde{m}(\sigma_{\mathcal{K}-\lambda}(L))$ ---- *contribution of* $\lambda$ *over* $L$

*CONTRIBUTION* CAN BE USED TO DETECT AND OVERCOME VULNERABILITIES, AND DETECT POSSIBLE *DECEPTIONS*

FIG. 7

CONSTRUCTION OF CONSISTENT HIGHER ORDER AKBS $$\mathcal{K}_k^0 = \{\underline{\alpha}_\mathcal{K}(r(\mu)) \to \mu \mid \mu \in \mathcal{K}\}$$

$$\mathcal{K}_k^1 = \{(\gamma(\mu))' \to \mu \mid \mu \in \mathcal{K}\}$$

Algorithm 7.1 (Construction of $\mathcal{K}_k^2$) Given an AKB $k$. Output the immediate extension $\mathcal{K}_k^2$ of $\mathcal{K}$.

1. Let $K = \emptyset$.

2. For each $= \tau \in M_\mathcal{K}$ and each $\mu \in \tau$, let $G(\mu, t)$ be a new symbol in $\varepsilon_\mathcal{K}$.

3. For each $= \tau \in M_\mathcal{K}$ add to $C_\mathcal{K}$ the constraint that the collection $\{G(\mu,\tau) \mid \mu \in \tau\}$ forms a partition of $\alpha_\mathcal{K}(\tau)$.

4. For each $= \mu \in \mathcal{K}$, add to $\mathcal{K}$ the object, $\cap_{\tau \in T_\mathcal{K}(\mu)}(G(\mu,\tau))' \to \mu$.

5. Return $\mathcal{K}$.

FIG. 9

GRAPH REPRESENTATION

Let $C$ be a weakly acceptable collection of constraints for $\varepsilon \triangleleft 2^U$.

1. The *directed graph associated with* $(\varepsilon, C)$, denoted by $\mathcal{G}_\varepsilon(C)$, is the directed graph $(\varepsilon, \mathcal{R})$, where $\mathcal{R} = \{ (A, B) \mid A, B \in \varepsilon,$ either $(A \cap B = \emptyset)$ or $(A \subseteq B) \in C\}$.

2. The *SR-graph associated with* $(\varepsilon, C)$ is the directed graph $\mathcal{G} = (\varepsilon, R)$ where $R = \{ (A, B) \mid A, B \in \varepsilon, (A \subseteq B) \in C\}$.

FIG. 11

CHECKING FOR ADMISSIBILITY

Algorithm 12.2 (Checking for Admissibility) Let C be an acceptable collection of constraints for $\varepsilon \vartriangleleft 2^U$.

1. Construct $G = |\mathcal{G}_\varepsilon(C)|$.

2. Let $\prec_0$ be any total ordering on $\varepsilon$. Construct the RBFS-ordering $\prec$ over G based on $\prec_0$ using Algorithm 12.1

3. For $i = 1$ to $i = |\varepsilon|$, do the following:

(a) Determine $\Gamma \mathcal{G}_{,\prec}(E_i)$.

(b) For every $A, B \in \Gamma \mathcal{G}_{,\prec}(E_i)$, determine whether or not $\{A, B\}$ is in C. If $\{A, B\} \notin C$, stop. C is not admissible. Otherwise, continue.

4. Stop. C is admissible.

FIG. 12

CHECKING FOR COMPATIBILITY

Let $C$ be an admissible collection of constraints for $\varepsilon \triangleleft 2^U$ and let m be a measure over $\varepsilon$. The following statements are equivalent:

1. $m$ and $C$ are compatible.

2. $m$ is super additive over $C$.

3. There exists a total ordering $\prec$ on $E$ which is permissible on $\mathcal{G} = |\mathcal{G}_\varepsilon(C)|$, such that for all
   $1 \leq i \leq m$, $m^i_{c,\mathcal{G},\prec} \leq m(E_i) \leq m^i_{p,\mathcal{G},\prec} - m^i_{s,\mathcal{G},\prec}$, where $\varepsilon = \{E_1, E_2, ..., E_m\}$ is ordered according to $\prec$.

4. For all total ordering $\prec$ on $\varepsilon$ which is permissible on $\mathcal{G} = |\mathcal{G}_\varepsilon(C)|$, and for all $1 \leq i \leq m$,
   $m^i_{c,\mathcal{G},\prec} \leq m(E_i) \leq m^i_{p,\mathcal{G},\prec} - m^i_{s,\mathcal{G},\prec}$, where $\varepsilon = E_1, E_2, ..., E_m\}$ is ordered according to $\prec$.

Criteria 2, 3 or 4 above together with Algorithm 13.1 can be used to test and ensure that $m$ and $C$ are compatible.

FIG. 13

OPTIMAL METHOD TO GUARANTEE COMPATIBILITY

Problem 13.1 (Minimization Problem for Compatibility) Let C be a collection of constraints for $\varepsilon \triangleleft 2^U$, and m a measure over $\varepsilon$.

1. For each $E \in \varepsilon \cup \{U\}$, let $x_E$ be a real variable where $0 \leq x_E \leq m(E)$.

2. For each $\varepsilon_0 \subseteq \varepsilon$ and $E_0 \in \varepsilon$ where $\varepsilon_0$ is a maximal disjoint group of $E_0$ under C, introduce the linear constraint $\Sigma_{E \in \varepsilon_0} x_E \leq x_{E_0}$.

3. Minimize the objective function
$$\sum_{E \in \varepsilon} (m(E) - x_E)^2.$$

Problem 13.1 is a quadratic programming problem [17] and therefore can be solved using standard techniques.

FIG. 14

PREPROCESSING

Algorithm 14.1 (Preprocess $\varepsilon$, C and m) Let C be an acceptable collection of constraints for $\varepsilon \triangleleft 2^U$, $\prec_0$ a total ordering on $\varepsilon$, and .m a measure over $\varepsilon$.

1. Construct $\mathcal{G} = |\mathcal{G}_\varepsilon(C)|$.
2. Construct the RBFS-ordering $\prec$ over $\mathcal{G}$ based on $\prec_0$ using Algorithm 12.1.
3. Order the nodes in $\mathcal{G}$ according to $\prec$. Say E1, E2, ...Em.
4. For k = 1 to k = m, do the following:
   (a) Determine $\Gamma_{\mathcal{G}, \prec}(E_k)$.
   (b) For every $A, B \in \Gamma_{\mathcal{G}, \prec}(E_k)$, determine whether or not $\{A, B\}$ is in C. If $\{A, B\} \notin C$, stop. C is not admissible. Otherwise, continue.
   (c) Constuct a well-nested tree Tk for $\Gamma_{\mathcal{G}, \prec}(E_k)$.
   (d) Determine $m^k_{p, \mathcal{G}, \prec}$, $m^k_{s, \mathcal{G}, \prec}$, and $m^k_{c, \mathcal{G}, \prec}$, (see Algorithm 13.1)
   (e) Test whether or not the conditions for compatibility are satisfied. If any of the conditions are violated, stop. C is not compatible with m. Otherwise, continue.
   (f) Let $m_{\mathcal{G}, \prec}(E_k) = [m(E_k) - m^k_{c, \mathcal{G}, \prec}] \div [m^k_{p, \mathcal{G}, \prec} - m^k_{s, \mathcal{G}, \prec} - m^k_{c, \mathcal{G}, \prec}]$
5. Return $m_{\mathcal{G}, \prec}$.

FIG. 15

AUGMENTED KNOWLEDGE BASE AND REASONING WITH UNCERTAINTIES AND/OR INCOMPLETENESS

CROSS-REFERENCE TO RELATED APPLICATIONS

This application is based upon and claims priority to prior U.S. Provisional Patent Application No. 61/645,241 filed on May 10, 2012 in the US Patent and Trademark Office, the entire contents of which are incorporated herein by reference.

FIELD

The embodiments of the present invention relate to a computer implemented knowledge-based system and reasoning with uncertainties and/or incompleteness.

BACKGROUND

Reasoning with uncertainties and/or incompleteness refers to the various processes leading from evidences or clues to conclusions or guesses using uncertain, vague, partial, incomplete and/or limited information. Reasoning with uncertainties mostly refers to information which are uncertain, vague and/or inexact; while reasoning with incompleteness refers to information which are incomplete, partial and/or limited. A knowledge-based system under uncertainties and/or incompleteness is a knowledge base where reasoning with uncertainties and/or incompleteness are involved.

Knowledge-based systems involving uncertainties and/or incompleteness have been studied widely in the literature. Many approaches have been introduced to model such knowledge bases, but none are satisfactory in general.

The basic building blocks of knowledge bases are knowledge, which are usually represented as rules, propositions, or other equivalent means.

Moreover, in most traditional knowledge bases with uncertainties and/or incompleteness, each piece of knowledge in the knowledge base is associated with or mapped to a number, variably referred to as belief, certainty factor, likelihood, weight, etc.

To perform reasoning/inferences, either an extension scheme for the mapping mentioned above, or a conditioning/composition rule must be specified.

SUMMARY

According to embodiments of the invention, a new knowledge-based system under uncertainties and/or incompleteness, referred to as augmented knowledge base (AKB) is provided; and methods for constructing, reasoning, analyzing and applying AKBs are provided. In addition, a new method for reasoning under uncertainties and/or incompleteness is provided. This method will be referred to as augmented reasoning (AR). Advantages and powers of are described herein.

According to an aspect of an embodiment, a method and apparatus are provided for representing a knowledge base by creating objects in the form E→A, where A is a rule in the knowledge base, and E is a set of evidences that supports the rule A; and determining, by deductive reasoning using the knowledge in the knowledge base and/or inducting or extracting new knowledge from the knowledge base; and constructing higher order knowledge bases to insure that the knowledge base is consistent. Such knowledge base will be referred to as augmented knowledge base. For example, a composite set of evidences G is computed, the composite set of evidences G is a combination of sets of evidences E in the knowledge base in support of a target rule L that is implied by a combination of rules in the knowledge base.

These and other embodiments, together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 2 is an example data structure of an AKB with example data entries, according to an embodiment of the present invention.

FIG. 4 is a flow diagram of an example unification algorithm, according to an aspect of an embodiment of the invention.

FIG. 5 provides types of measures for representing the strength of a body of evidences, according to an embodiment of the present invention.

FIG. 7 is a table of methods for testing and ensuring properties of AKB, according to an embodiment of the present invention.

FIG. 9 is a flow diagram of constructing consistent higher order AKBs, according to an embodiment of the present invention.

FIG. 11 is a flow diagram for generating graph representations of constraints for bodies of evidences, according to an embodiment of the present invention.

FIG. 12 is a flow diagram of checking for admissibility, according to an embodiment of the present invention.

FIG. 13 is a flow diagram of checking for compatibility between the measure and the collection of constraints, according to an embodiment of the present invention.

FIG. 14 is a flow diagram of guaranteeing compatibility, according to an embodiment of the present invention.

FIG. 15 is a flow diagram of preprocessing, according to an embodiment of the present invention.

DETAILED DESCRIPTION OF EMBODIMENT(S)

Section 1. Augmented Knowledge Base

Figure 1:
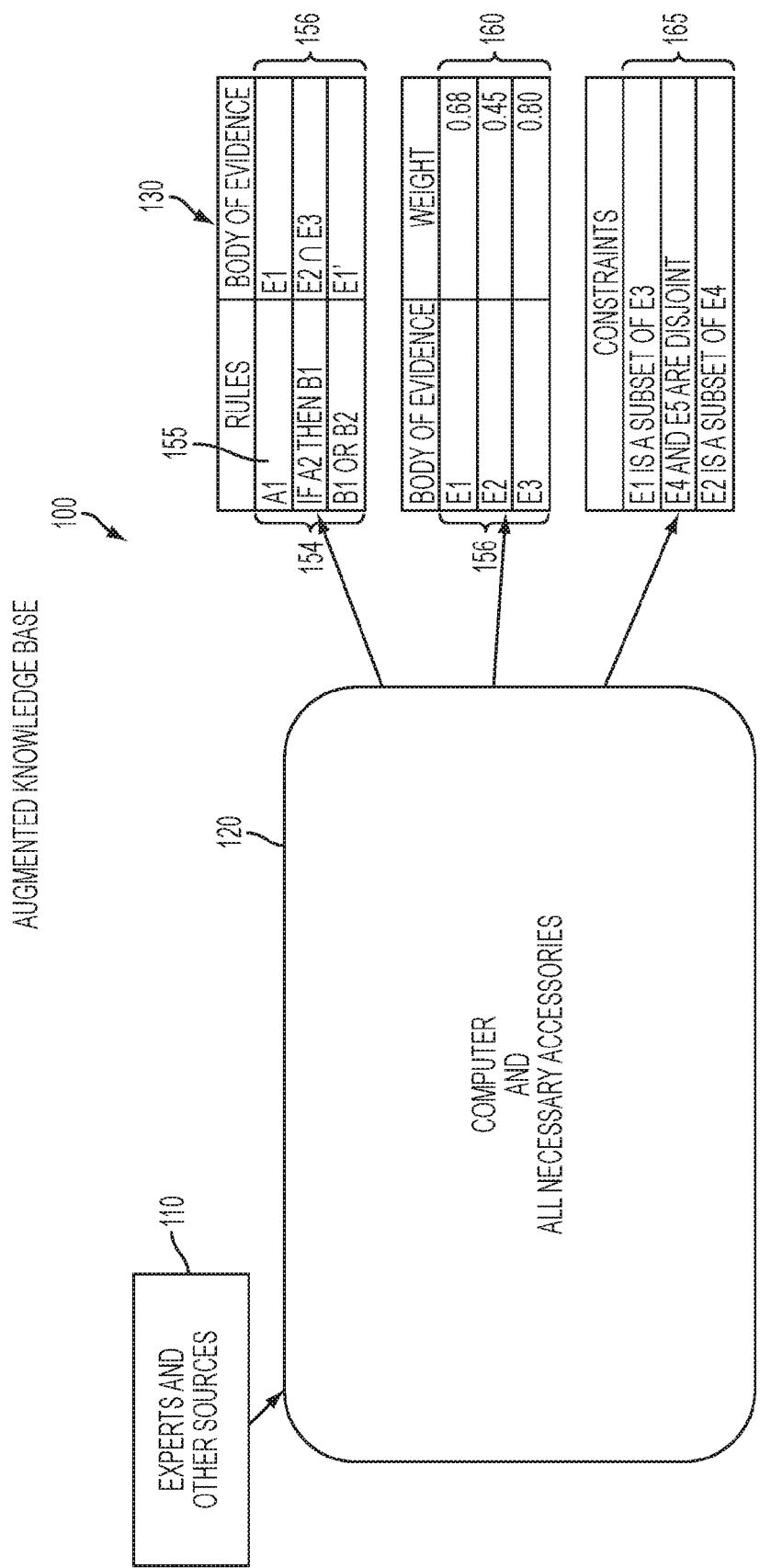
FIG. 1 is a functional block diagram of an augmented knowledge base (AKB) computer system, according to an embodiment of the present invention.

According to an aspect of an embodiment, a knowledge based system refers to a system comprising a knowledge base for representing knowledge, acquisition mechanisms and inference mechanisms, an augmented knowledge base κ includes one or more objects of the form E→A, where A is a logical sentence in a first-order logic, a proposition and/or a rule (referred to collectively herein as 'a rule') in the traditional sense; and E is a set of evidences (a plurality of evidences) as a body of evidences that supports A. Moreover, each given body of evidences (not each rule as in a typical knowledge base) is mapped to or associated with a value.

Since bodies of evidences are sets, in an aspect of an embodiment, the relations among the bodies of evidences are considered. The ability of AKBs to deal with relationships among the bodies of evidences, or its capability to take into account constraints imposed on the bodies of evidences, is a unique feature of AKB, which can lead to more powerful, robust, accurate and/or refined characterizations of the knowledge base.

In an embodiment of the present invention, inference or reasoning in an AKB is done in two separate phases: Form the body of evidences that supports the target rule, and then determine the value associated with the resulting body of evidences. The second phase can be done in many different ways, including the reasoning scheme AR based on constraint stochastic independence method, which is part of this invention. AR provides a clear probabilistic semantics, resulting in the elimination of virtually all known anomalies associated with existing formalisms of uncertain reasoning and knowledge bases.

In addition, in an aspect of an embodiment, we provide methods for testing and ensuring certain properties of AKBs, including consistency, completeness, monotonicity, contribution, vulnerability, deception, etc.

Moreover, in an aspect of an embodiment, we show how AKBs can be used for inductive inference. Indeed, we show that inductive inference can be used to extract meaningful new knowledge from AKBs provided certain consistency conditions are met.

Furthermore, in an aspect of an embodiment, we provide methods to guarantee (also referred to herein as a substantial guarantee) a required (or specified) consistency via higher order AKBs.

Lastly, in an aspect of an embodiment, we show how AKBs can be used to build free-form database (FFDB). We then show how FFDB can be used to formulate augmented relational databases, augmented deductive databases and augmented inductive databases. The latter can be used for extracting new information from relational databases (e.g. data mining).

In an embodiment of the present invention, a method for solving the following aged-old problem is provided: Given two arbitrary sets A and B, if the probabilities, p(A) and p(B), of both sets are known, what is the probability of their intersection, i.e., $p(A \cap B)$? This problem could be trivial if the probability is defined over the entire probability space. However, in many important applications, such as reasoning with uncertainty, which is one of the main concerns of this invention, the probabilities of only a few sets are given and there is a need to determine the probabilities of other sets formed from these sets, i.e., extending the probability measure from a given collection of sets to a larger collection of sets formed from the given sets. Knowing how to compute $p(A \cap B)$ from p(A) and p(B) provides the cornerstone for the extension schemes.

The extension scheme given in an embodiment of the present invention uses an average method to determine the probability of the new set. It has a clear probabilistic semantics, and therefore not subject to the anomalies that are usually associated with other extension schemes.

Moreover, in an aspect of an embodiment, the present invention is capable of dealing with constraints imposed on the sets that are given.

Furthermore, in an aspect of an embodiment, necessary and sufficient conditions for the extension to be well-defined, as well as, necessary and sufficient conditions for compatibility are provided.

Lastly, in an embodiment of the present invention, a pre-processing algorithm is provided so that the extension can be computed more efficiently.

Let $\kappa$ be an AKB. The A in (E→A) is a rule in $\kappa$, which can be a logical sentence in a first-order logic, a proposition and/or a rule in a traditional knowledge base. In this case, we say that $A \in \mathcal{L}$, i.e., A is a member of $\mathcal{L}$, where $\mathcal{L}$ is the collection of all knowledge of interest. On the other hand, the E in (E→A) is a set, representing a body of evidences, and is not a rule. In this case, we say that $E \subseteq U$, i.e., E is a subset of U, where U is a universal set of evidences. Moreover, the (E→A) is not a rule either. It specifies that the body of evidences E supports the rule A. More precisely, if E is established or true, then A is true. This signifies that the full force of E devolves on A. Associating a body of evidences (i.e., a set of evidences) with a rule is a novel feature of this invention and is a central characteristic of augmented knowledge bases. The bodies of evidences supporting a rule can be obtained from many different sources (including expert opinions, scientific literature, news articles, blogs, etc.) and can be determined either subjectively or objectively.

In the rest of this document, $\subseteq$ will always denote 'is a subset of', while $\in$ will denote 'is a member of' or 'belonging to'.

In most traditional knowledge-based systems that deal with uncertainties and/or incompleteness, rules are associated with numbers. These numbers are variably referred to as beliefs, certainty factors, likelihood, weight, etc. On the other hand, as illustrated in FIG. 1, in an AKB computer system 100, each rule A in an AKB is associated with a 'set' E—the body of evidences (plural or two or more evidences) that supports the rule. In addition, in contrast to typical knowledge bases, according to an embodiment of, a set of evidences E as a given body of evidences (not each rule) is mapped to or associated with a value (e.g., weight) (see also FIG. 2). These are several unique features of AKB. In FIG. 1, a computer 120 is configured to provide the described augmented knowledge base functions, including storing an augmented knowledge base 130. Experts and other sources 110 refer to one or more processing devices (e.g., computer, mobile device, mobile phone, etc.) as sources of evidences (E) and/or rules (A) to the AKB computer 120 over one or more data communication technologies, such as Internet, wire, wireless, cellular phone network, etc. The form of information of the experts and other sources 110 can be a database, blog, chat rooms data, social network website databases, other knowledge bases, etc. The FIG. 2 is an example data structure of an augmented knowledge base (AKB) 150 with example data entries for the AKB, according to an embodiment of the present invention. The embodiments utilize entries of the AKB, such as FIG. 2, to further augment a knowledgebase of rules in $\mathcal{L}$ 154 by determining (outputting or computing) support for a desired (target) rule L, namely an unknown rule that would like to be established. According to an aspect of an embodiment a target rule L can be added to the rules in $\mathcal{L}$ 154 in the AKB 150.

In FIG. 2, for example, 154 is $\mathcal{L}$, which is the collection of all knowledge in form of rules A 155 of interest. The body of evidences 160 (E) support the respective rules 155 (A) (i.e., (E→A)). In FIG. 2, the body of evidences 160 (E) is mapped to a number 160, variably referred to as belief, certainty factor, likelihood, weight, etc. Sources 110 for the evidences are also provided. The constraints 165 are relationships among the bodies of evidences Es 156 (the capability to take into account constraints 165 imposed on the bodies of evidences Es 156), which is a feature of AKB to derive more powerful, robust, accurate and/or refined characterizations of the knowledgebase rules $\mathcal{L}$. For example, in FIG. 2, E106 is a subset of E104, since the pH level in E106 contains that of E104.

An object generated includes a set of evidences E 156 and the rule A 156 supported by E 156. According to an aspect of an embodiment, an object in the form of E→A may be implemented as a data object (a data structure, a class) for electronically storing a set of evidences E 156 and a rule A 156 supported by E 156. The data object may be associable or include links to (a) value (e.g., weight) for E 160, (b) sources in support of E 110, and (c) constraints for E 165, as discussed in more detail herein.

An apparatus is provided including a computer readable storage medium configured to support managing (by way of storing) objects in the form E→A, where A is a rule in the knowledge base, and E is a set of evidence that supports the rule A; and a hardware processor (for example, computer processor and/or circuitry) to execute computing a composite set of evidences G, the composite set of evidences G being a combination of sets of evidences E in the knowledge base in support of a target rule L implied by a combination of rules in the knowledge base. E and A are electronically represented in computer readable media as data values (identifiers), including other values associated with E and/or A, such as weight values assigned to E, for processing, for example, generation (formation), computations or determinations of set(s) of data values and relations among the sets to deduce and/or induce target rule L as well as indicate validity or strength of target rule L.

Since bodies of evidences are sets, AKB could explicitly consider the relations among the bodies of evidences. The ability of AKBs to deal explicitly with relationships among the bodies of evidences, or its capability to take into account constraints imposed on the bodies of evidences, is another unique feature of AKB, which can lead to more powerful, robust, accurate and/or refined characterizations of the knowledge base.

In an AKB, evidences (the Es) and rules (the As) can represent completely different objects and each play an essential but separate role in the operations of an AKB. The dichotomy between rules and evidences is a novel approach, and is one of the critical differences between AKB and all the known models of knowledge bases. The power and flexibility offered by such a separation is yet another unique feature of AKB.

In an AKB, for example, no conditions are imposed on either E or A. Therefore, for example, it is further possible to have both $E_1 \rightarrow A$ and $E_2 \rightarrow A$ in the AKB. This means two or more sets (a set being two or more evidences Es also referred to as 'body of evidences') of evidences can support the same rule, thereby allowing, among other things, multiple experts/sources to be involved in designing a single AKB. Since typical knowledge bases do not associate evidences with rules, they would not be readily capable of dealing with multiple experts/sources for consolidating rules from different experts/sources. On the other hand, AKBs allow experts/sources to interact freely and completely, if necessary. AKBs could even monitor the experts/sources to determine their reliabilities and possible deceptions (see Sections 4). This is another unique feature of AKB.

Let $\kappa$ be an AKB. The extension of $\kappa$, denoted by $\hat{\kappa}$, is defined recursively as follows:

1. $(\emptyset \rightarrow_\kappa F)$, $(U \rightarrow_\kappa T) \in \hat{\kappa}$, where T and F represent the logical constants TRUE and FALSE, respectively.
2. if $\omega = (E \rightarrow L) \in \kappa$ then $(E_2 \rightarrow_\kappa L) \in \hat{\kappa}$.
3. if $\omega_1 = (E_1 \rightarrow_\kappa L_1)$, $\omega_2 = (E_2 \rightarrow_\kappa L_2) \in \hat{\kappa}$ then $\omega_1 \vee \omega_2 = ((E_1 \cup E_2) \rightarrow_\kappa (L_1 \vee L_2)) \in \hat{\kappa}$ and $\omega_1 \wedge \omega_2 = ((E_1 \cap E_2) \rightarrow_\kappa (L_1 \wedge L_2)) \in \hat{\kappa}$.

$\hat{\kappa}$ is extends $\kappa$ so that AKBs can deal with composite objects $\omega$, associated with combinations of sets of evidences E in the knowledge base and combinations of rules in the knowledge base. Therefore, the embodiments utilize both composite evidences and composite rules to establish support for a target rule.

In the rest of this document, $\cup$ and $\cap$ denote 'set union' and 'set intersection', respectively, while $\vee$ and $\wedge$ denote 'logical or' and 'logical and', respectively.

Let $\kappa$ be an AKB.

If $\omega = (\alpha \rightarrow_\kappa \beta) \in \hat{\kappa}$, then $l(\omega) = \alpha$ and $r(\omega) = \beta$.

$\omega$ is a composite object, $l(\omega)$ denotes a composite set of evidences associated with $\omega$, and $r(\omega)$ denotes the composite rules associated with $\omega$. This enable is to extract the rule portion and the associated set of evidences portion from $\omega$, where $\omega$ represents a composite object of a plurality of E→A.

Figure 3:
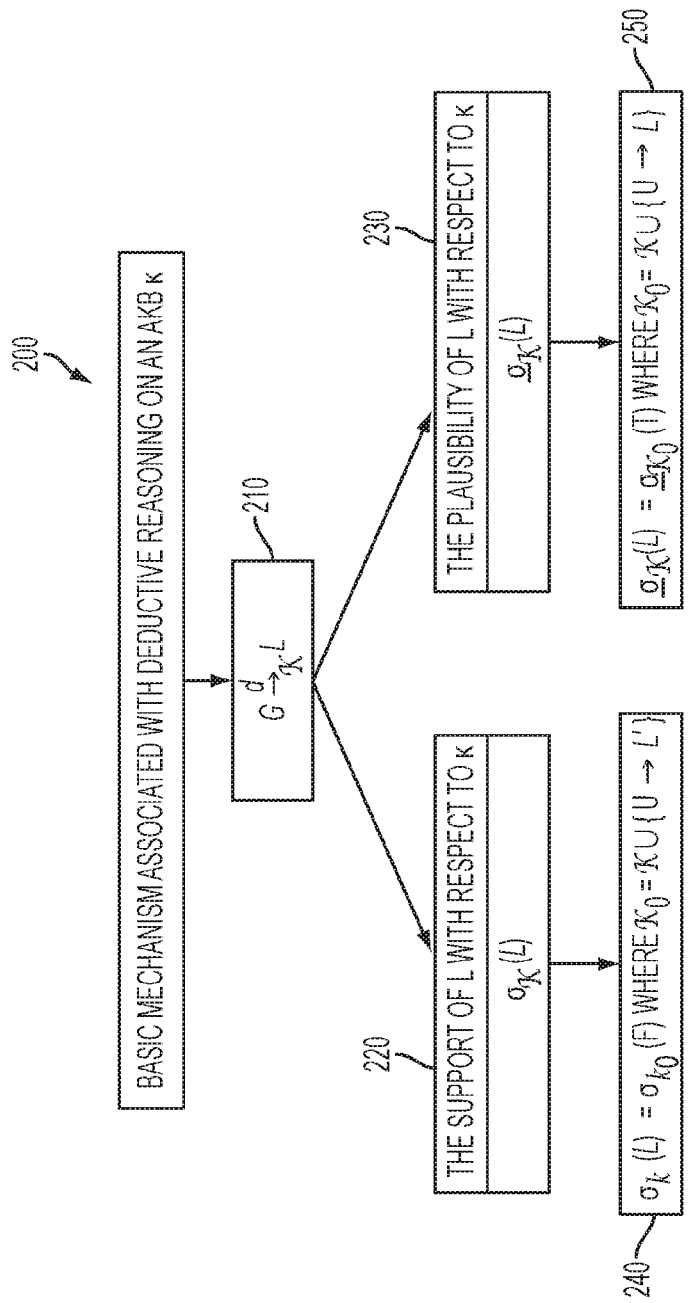
FIG. 3 provides the basic mechanism for deductive reasoning on an AKB, according to an embodiment of the present invention.

Let $\kappa$ be an AKB, $G \subseteq U$ (G is a body of evidences from universal set of evidences U) and $L \in \mathcal{L}$, where $\mathcal{L}$ is the collection of knowledge or rules (given or otherwise) which we are interested in. In FIG. 3, the basic operation at 210 for deductive reasoning is $$G \xrightarrow{d}_\kappa L,$$

where G is a composite set of evidences and L is a target rule. A target rule L refers to a rule in $\mathcal{L}$ or an unknown rule that would like to be established. More detail explanations can be found throughout this section.

$$G \xrightarrow{d}_\kappa L$$

where, d denotes deductive reasoning, if and only if there exists $\omega \in \hat{\kappa}$ is such that $l(\omega) = G$ and $r(\omega) \Rightarrow L$.

$l(\omega) = G$ means that G is the composite set of evidences that supports $r(\omega)$, $\omega$ being a composite object of a plurality of E→A, and $r(\omega) \Rightarrow L$ means that the if the composite rule $r(\omega)$ is true, then the target rule L is true. In other words, $\Rightarrow$ stands for 'logical implication.'

$$G \xrightarrow{d}_\kappa L$$

is one of the key concepts for dealing with deductive reasoning and other aspects of AKBs. Among other things, it provides a natural way to show how a given $L \in \mathcal{L}$ is deductively related to $\kappa$. (See also FIG. 3). To put it in another way, $$G \xrightarrow{d}_\kappa L$$

means mere exists a composite object $\omega$ in the AKB $\kappa$ ($\omega$ is formed from objects of a plurality of E→A, in $\kappa$), where G is the composite set of evidences associated with ω, and the composite rule associated with ω implies (inferred by) L.

As an example, consider the partial AKB given in FIG. 2. Assume the target rule L is:

Velvet disease is TRUE or the fish color is yellowish.

To determine G, we will use the following objects in the AKB:

1. (E101→A101) where A101 is the rule 'water pH level less than 6.0' and the weight of E101 is 0.0014.
2. (E102→A102) where A102 is the rule 'water pH level is in [6.0, 7.0), i.e., the water pH level is greater than or equal to 6.0 but less than 7.0' and the weight of E102 is 0.1930.
3. (E121→A121) where A121 is the rule 'water condition is acidic when water pH level is less that 6.0 or (6.0, 7.0)' and weight of E121 is 1.0000.
4. (E133→A133) where A133 is the rule 'fish color is discolored—yellowish when water condition is acidic and velvet disease is false and weight of E133 is 0.3028.

Since L=(A101 ⊆ A 102)$\wedge$ A121 $\wedge$ A133, therefore $$G \xrightarrow{d}_\kappa L$$

where G=(E101∪E102) ∩E121 ∩E133. It is possible to have many other G where $$G \xrightarrow{d}_\kappa L.$$

For example, it is not necessary to use both objects 1 and 2.

$$G \xrightarrow{d}_\kappa L$$

holds by using only one or the other alone. Following the line of reasoning given above, if we observed that 'the fish color is not yellowish', then we can show that any G, where $$G \xrightarrow{d}_\kappa L,$$

is a set of evidences that supports the target rule 'velvet disease is TRUE'.

Let κ be an AKB and L∈$\mathcal{L}$.

At 220, the "support" of a target rule L with respect to the augmented knowledge base, (also denoted by $\sigma_{78}$(L)), is equal to the largest G ⊆ U where $$G \xrightarrow{d}_\kappa L.$$

At 230, the "plausibility" of target rule L with respect to the augmented knowledge base, (also denoted by $\underline{\sigma}_\kappa$(L)), is equal to [$\sigma_\kappa$(L')]'.

At 220, the concept of "Support" of L provides a natural way to determine the set of evidences included in and derivable from κ that deductively supports L. While at 230 the concept of "plausibility" of L determines the set of evidences included in and derivable from κ that does not deductively support (not L.) (See also FIG. 3). At 210, whether "support" of L and/or "plausibility" of L should be taken into account can depend upon whether strict and/or plausible support is sought.

240 and 250 are alternative determinations of the "support" of a target rule L and a "plausibility" of a target rule L. If G is a set or a subset of some universal set U, then G' will denote the complement of the set G, i.e., G' contains all the elements in U that is not in G.

Let κ be an AKB and L∈$\mathcal{L}$. One way of determining the support and plausibility are:

$\sigma_\kappa(L) = \sigma_{\kappa_0}(F)$ where $\kappa_0 = \kappa \cup \{U \rightarrow L'\}$(240), and $\underline{\sigma}_\kappa(L) = \underline{\sigma}_{\kappa_0}(T)$ where $\kappa_0 = \kappa \cup \{U \rightarrow L\}$(250).

In other words, to compute the support of L with respect to the AKB κ, add the object U→L' (where L' is a negated target rule L) to the AKB κ, and then compute the support of F with respect to the expanded AKB. The plausibility can be computed in a similar manner. Thus, the above methods (240 and 250) can be used to determine the support and plausibility of any L∈$\mathcal{L}$ by extending the original AKB κ. It is a universal method since it is only necessary to know how to determine the support of F or the plausibility of T for any AKBs. (See also FIG. 3)

Various algorithms for determining $\sigma_\kappa$(F), some polynomial and some non-polynomial, are given in Section 15 (Unification Algorithms) below (see FIG. 4 which is a flow diagram of an example unification algorithm, according to an aspect of an embodiment of the invention). In light of the above results, these algorithms can be used to determine the body of evidences that supports any L in an AKB.

In the above definition of AKB, we assume that it is universally accepted that E→A is true. If that is not the case, then E→A is supported by some body of evidences, say $G_0$. In other words, $G_0$→(E→A). If the latter is universally accepted, then we can stop there. Otherwise, it in turn is supported by yet another body of evidences, ad infinitum. The latter are clearly higher order AKB. Since $G_0$→(E→A) is equivalent to ($G_0 \cap$E)→A, thus, in most cases, it is only necessary to consider first-order AKB, the one defined above (see Section 7 for more detail discussions of higher order AKBs, as well as, the role of higher order AKBs). It is worthwhile to observe that if E=U for all (E→A) ∈κ, then we have a deterministic knowledge base, or a knowledge base without uncertainty.

According to an aspect of an embodiment, the way uncertainties and/or incompleteness is dealt with by 220, 230, 240 and/or 250 for deductive reasoning is unique and new, because both the composite rules and the composite sets of evidences are involved providing a more general, vigorous and stronger reasoning scheme.

Section 2. Evidences, Measures and Extensions

Any collection of sets is partially ordered by ⊆. Therefore the support function σ, or the plausibility function σ, induced a partial ordering on $\mathcal{L}$. Using this partial ordering, if $L_1, L_2 \in \mathcal{L}$ and $\sigma(L_1) \subseteq \sigma(L_2)$, we can say that $L_1$ has lesser support than $L_2$. However, if a ($L_1$) and $\sigma(L_2)$ are incomparable, then we don't have any measure of the relative strength of support for $L_1$ and $L_2$. In this section, we shall discuss the extension of the partial order into a linear order, or, more importantly, the definition of an absolute measure of strength of support for members of $\mathcal{L}$.

Unlike other knowledge-based systems, evidences play a front and center role in AKBs. However, a body of evidences could be an abstract concept. It is difficult, if not impossible, to completely specify all the evidences. Fortunately, in an embodiment of this invention, it is not essential to specify completely what the body of evidences consists of. One needs only to know the relations among the bodies of evidences, and the strength or validity of each body of evidences. These can in turn be used to determine the strength or validity of $L \in \mathcal{L}$.

We now present various methods, in the form of functions or mappings with domain $2^U$, the collection of all subsets of U, for use with AKBs to measure the strength or validity of the body of evidences associated with a rule.

FIG. 5 provides the types of measures, used for representing the strength or validity of the body of evidences, according to an embodiment of the present invention.

Let $\epsilon \subseteq 2^U$, where $2^U$ denotes the collection of all subsets of U. A measure m over $\subseteq$ is a function from $\epsilon$ into a linear ordered set, such that for all $E_1, E_2 \in \epsilon, m(E_1) \leq m(E_2)$ whenever $E_1 \subseteq E_2$. In other words, in an aspect of an embodiment of this invention, measures are monotonic.

Let $\epsilon \subseteq 2^U$. A probability measure m over $\epsilon$ is function from $\epsilon \cup \{\emptyset, U\}$ into [0,1], the close unit interval, which satisfies the following conditions:

1. $m(\emptyset)=0$ and $m(U)=1$.
2. $m(E_0) \geq m(E_1)+m(E_2)$ for all $E_0, E_1, E_2 \in \epsilon$ where $E_1 \cap E_2 = \emptyset$ and $E_1, E_2 \subseteq E_0$.
3. $m(E_1 \cup E_2) \leq m(E_1)+m(E_2)$ for all $E_1, E_2 \in \epsilon$ where $E_1 \cup E_2 \in \epsilon$.

In the above definition, as well as the rest of this document, 0 denotes the 'empty set' or the set that contains no elements.

Clearly, every probability measure over $\epsilon$ is a measure over $\epsilon$. Moreover, if $\epsilon = 2^U$, then the definition of probability measure given above is equivalent to the usual definition of probability measure.

Measures are also used in virtually all of the existing knowledge-based systems that deal with uncertainty. However, the measure considered in AKBs map a body of evidences into a member of a linear ordered set or into a real number. On the other hand, measures in existing knowledge-based systems map a rule directly into a real number.

Let $\kappa$ be an AKB. m is a (probability) $\kappa$-measure if and only if m is a (probability) measure over $\epsilon_\kappa$, the collection of all sets (body of evidences) given in an AKB.

Let $\kappa$ be an AKB. The extension of $\epsilon_\kappa$, denoted by $\tilde{\epsilon}_\kappa$, is the smallest collection of subsets of U that contains all the sets in $\epsilon$ and is closed under complement, union, and intersection. In other words, $\tilde{\epsilon}_\kappa$ includes sets which can be formed from $\epsilon$ in a natural manner.

Moreover, let m a (probability) $\kappa$-measure. An extension $\tilde{m}$ of m is a (probability) measure over $\tilde{\epsilon}_\kappa$ such that $\tilde{m}(E)=m(E)$ for all $E \in \epsilon$.

In the case where $\tilde{m}$ is probabilistic, the value $\tilde{m}(\sigma_\kappa(L))$, for $L \in \mathcal{L}$, can be interpreted as the probability that L is true.

By viewing conditioning/composition rules as extension schemes, it is clear that the ability to extend m to $\tilde{m}$ is equivalent to the ability to infer or to reason in existing knowledge-based systems. In an AKB, inference or reasoning can be done in two separate phases:

1. Form the body of evidences that supports the target rules.
2. Determine the value of $\tilde{m}$ for the body of evidences obtained in the first phase.

There are many schemes for extending a $\kappa$-measure m with domain $\epsilon_\kappa$ to $\tilde{m}$ with domain $\tilde{\epsilon}_\kappa$. Many try to capture the essence of the following, which holds for probability measure.

Let m be a probability measure over $2^U$ and G, $G_1, G_2 \subseteq U$. Then m satisfies the following conditions:

1. $\tilde{m}(E')=1-m(E)$.
2. $\max(0, m(G_1)+m(G_2)-1) \leq m(G_1 \cap G_2) \leq \min(m(G_1), m(G_2))$.
3. $\max(m(G_1), m(G_2)) \leq m(G_1 \cup G_2) \leq \min(1, m(G_1)+m(G_2))$.

The above observation, which can also be found in Eugene S. Santos and Eugene Santos, Jr. Reasoning with uncertainty in a knowledge-based system. In *Proceedings of the seventeenth international symposium on multi-value logic*, Boston, Mass., pages 75-81, 1987 the result are the same but are use differently), was used there to compute the probabilities of the union and intersection, are used in this invention to determine a lower bound and an upper bound for m(E), for every $E \in \tilde{\epsilon}$, provided m is a probability measure. Unfortunately, after applying the results a few times, the lower and upper bound quickly approaches 0 and 1, respectively, yielding very minimal useful information.

Schemes for extending a measure m over $\epsilon$ to a measure $\tilde{m}$ over $\tilde{\epsilon}$ are provided.

1. $\tilde{m}(E')=1-m(E)$,
 $\tilde{m}(E_1 \cap E_2)=\min(m(E_1), m(E_2))$, and
 $\tilde{m}(E_1 \cup E_2)=\max(m(E_1), m(E_2))$.
2. $\tilde{m}(E')=1-m(E)$,
 $\tilde{m}(E_1 \cap E_2)=\max(0, m(E_1)+m(E_2)-1)$, and
 $\tilde{m}(E_1 \cup E_2)=\min(1, m(E_1)+m(E_2))$.
3. $\tilde{m}(E')=1-m(E)$,
 $\tilde{m}(E_1 \cap E_2)=m(E_1) m(E_2)$, and
 $m(E_1 \cup E_2)=1-(1-m(E_1))(1-m(E_2))$ Schemes 1, 2 and 3 above all satisfy the DeMorgan's law, and can be applied to compute $\tilde{m}(E)$ for any $E \in \tilde{\epsilon}_\kappa$. However, one could run into various problems by using these schemes indiscriminately, as witness by many existing knowledge-based systems that use expressions similar to some of those given above to manipulate their numbers. Worst yet, for all three schemes above, the values of $\tilde{m}(E)$, where $E \in \tilde{\epsilon}_\kappa$, may not be unique, since they may depend on how E is expressed. Moreover, Schemes 1 and 2 are not probabilistic (they are not additive). On the other hand, Scheme 3 implicitly assume that all the sets in $\epsilon$ are stochastically independent. Due to this implicit assumption, Scheme 3 has not been strictly applied in real applications.

Of course, many other schemes existed in the literature. Many are ad-hoc, such as the composition rule for certainty factors used in the original MYCIN (Bruce G. Buchanan and Edward H. Shortliffe. *Rule-Based Expert Systems*. Addison Wesley, 1984). There are also other schemes that are essentially modifications and/or combinations of the above schemes, such as the composition rule (orthogonal sum) used by the Dempster-Shafer approach (G. Shafer. *A Mathematical Theory of Evidence*. Princeton University Press, 1976). Finally, there is a natural scheme for extending a probabilistic m into a probabilistic $\tilde{m}$, namely, the constraint stochastic independence method introduced in the latter part of this invention, which can be used to form a new reasoning scheme, the augmented reasoning. This scheme is particularly suited for AKBs.

It is not necessary to select just one extension scheme for m for a given AKB. It is possible, and, in fact, beneficial at times to use more than one schemes either simultaneously and/or conditionally. In the latter case, several schemes may be provided and based on L and/or how L is formed, a particular scheme is then selected to evaluate the validity of L. A version of multiple schemes that is being used conditionally is given in (L. A. Zadeh. A simple view of the Dempster-Shafer theory of evidence and its implication for the rule of combination. *AI Magazines*, 7:85-90, 1986) in connection with fuzzy knowledge bases. However, in this case, as in virtually all existing cases, the extension is applied directly to the rules rather than the bodies of evidences.

Clearly, a complete formulation of an AKB requires the specifications of $\kappa$, m, and the scheme for extending m to $\tilde{m}$. The extension scheme is just one of the facets in an AKB, and any scheme could be used for that purpose. By selecting appropriately the E, the A, and the E→A, as well as, m and the extension scheme for m, most of the well-known approaches to knowledge bases and uncertain reasoning, including probabilistic logic (N.J. Nilsson. Probabilistic logic. *Artificial Intelligence*, 28:71-87, 1986), Dempster-Shafer theory (G. Shafer. *A Mathematical Theory of Evidence*. Princeton University Press, 1976), Bayesian network (Judea Pearl. *Probabilistic Reasoning in Intelligent Systems: Networks of Plausible Inference*. Morgan Kaufmann, 1988), Bayesian knowledge base Eugene Santos, Jr. and Eugene S. Santos. A framework for building knowledge-bases under uncertainty. *Journal of Experimental and Theoretical Artificial Intelligence*, 11:265-286, 1999), fuzzy logic (L. A. Zadeh. The role of fuzzy logic in the management of uncertainty in expert systems. *Fuzzy Sets and Systems*, 11:199-227, 1983; L. A. Zadeh. Fuzzy sets. *Information and Control*, 8:338-353, 1965. 41; R. Yager. Using approximate reasoning to represent default knowledge. *Artificial Intelligence*, 31:99-112, 1987), numerical ATMS (Johan DeKleer. An assumption-based TMS. *Artificial Intelligence*, 28:163-196, 1986), incidence calculus (Alan Bundy. Incidence calculus: A mechanism for probabilistic reasoning. *Journal of Automated Reasoning*, 1(3):263-283, 1985; Weiru Liu and Alan Bundy. Constructing probabilistic atmss using extended incidence calculus. *International Journal of Approximate Reasoning*, 15(2):145-182, 1996), etc. can be formulated as special cases of AKBs (see Section 3).

Section 3. Comparative Studies

The definition of AKB given in Section 1 encompasses virtually all of the widely used formalisms of uncertain reasoning and knowledge bases. As we shall see below, these existing systems can be formulated as AKBs according to the embodiments of the present invention by imposing certain restrictions on the relations among the E, the A, and the (E→A) in κ, as well as, on how the κ-measure m is extended.

For illustration purposes, we shall consider the following well-known formalisms: probabilistic logic (N. J. Nilsson. Probabilistic logic. *Artificial Intelligence*, 28:71-87, 1986), Bayesian network (Judea Pearl. *Probabilistic Reasoning in Intelligent Systems: Networks of Plausible Inference*. Morgan Kaufmann, 1988) and Bayesian knowledge base (Eugene Santos, Jr. and Eugene S. Santos. A framework for building knowledge-bases under uncertainty. *Journal of Experimental and Theoretical Artificial Intelligence*, 11:265-286, 1999), and Dempster-Shafer theory (G. Shafer. *A Mathematical Theory of Evidence*. Princeton University Press, 1976).

A probabilistic logic can be defined by an ordered pair ($\mathcal{P}$, p), where $\mathcal{P}$ is a finite collection of elements in $\mathcal{L}$, a first order logic, and p is a function from $\mathcal{P}$ into [0,1]. For simplicity, instead of a first order logic, assume that $\mathcal{L}$ is a propositional calculus. For each $P \in \mathcal{P}$, associate the set $E_P$, and let κ be the AKB including all $E_P \to P$ and $E_{P'} \to P'$, where $P \in \mathcal{P}$. (There is a one-to-one correspondence between P and $E_P$, where $E_P$ is the set version of the logical expression P.) Moreover, define m such that $m(E_P) = p(P)$ for all $P \in \mathcal{P}$. Extend m into $\tilde{m}$ that satisfies the 3 properties of probabilistic measure given in Section 2. It can be shown that the resulting AKB κ is equivalent to ($\mathcal{P}$, p).

Both Bayesian networks and Bayesian knowledge bases can be defined by specifying a finite collection $\mathcal{P}$ of conditional probabilities subject to certain restrictions. Let $\mathcal{R}$ denote the collection of all random variables used in the Bayesian network or Bayesian knowledge base, and for each $X \in \mathcal{R}$, let $I_X$ represents the set of all possible instantiations of X. A typical element A of $\mathcal{P}$ is of the form: $p(X=a|X_1=a_1, X_2=a_2, \ldots, X_k=a_k)$, where $X \in \mathcal{R}$, $a \in I_X$, and for all $1 \le i \le k$, $X_i \in \mathcal{R}$ and $a_i \in I_{X_i}$.

Associate with each element $A \in \mathcal{P}$ :the rule $$(X_1=a_1) \wedge (X_2=a_2) \wedge \ldots \wedge (X_k=a_k) \Rightarrow (X=a),$$

and the set $E_A$.

Let κ be the AKB containing one or more (e.g., all) objects of the form $E_A \to A$ where $A \in \mathcal{P}$. Moreover, define m such that:

$$m(E_A) = p(X=a|X_1=a_1, X_2=a_2, \ldots, X_k=a_k).$$

Let $A=((X_1=a_1) \wedge (X_2=a_2) \wedge \ldots \wedge (X_k=a_k) \Rightarrow (X=a)) \in \mathcal{A}_\kappa$, and $=((Y_1=b_1) \wedge (Y_2=b_2) \wedge \ldots \wedge (Y_l=b_l) \Rightarrow (Y=b)) \in \mathcal{A}_\kappa$. A~B means for all $1 \le i \le k$ and $1 \le j \le l$, $a_i = b_j$ whenever $X_i = Y_j$. In other words, A and B are antecedent-compatible. In order to capture the properties of conditional probabilities, the following conditions are needed: For every A, $B \in \mathcal{A}_\kappa$, if A~B, X=Y but $a \ne b$, then $E_A \cap E_B = \emptyset$.

However, for Bayesian knowledge bases, an additional property is needed: For every A, $B \in \mathcal{A}_\kappa$, if A~B, X=Y and a=b, then $E_A = E_B$. (This is the exclusivity property given in Eugene Santos, Jr. and Eugene S. Santos. A framework for building knowledge-bases under uncertainty. *Journal of Experimental and Theoretical Artificial Intelligence*, 11:265-286, 1999.)

On the surface, it might seem that Bayesian networks and Bayesian knowledge bases can deal with relationships or constraints among the sets. Actually, they cannot handle constraints unless they are inherent in probability theory or in their definition. In other words, neither can handle externally imposed constraints.

Bayesian networks and Bayesian knowledge bases essentially employed Scheme 2 given in Section 2 with the proviso that $\tilde{m}(A \cap B) = 0$ whenever $A \cap B = \emptyset$. It can be shown that the resulting AKB κ, as defined above, are equivalent to the corresponding Bayesian network or Bayesian knowledge base.

Another well-known reasoning scheme is based on Dempster-Shafer theory (DST)(G. Shafer. *A Mathematical Theory of Evidence*. Princeton University Press, 1976). Using DST terminology, consider a simple support function S with focal element A and degree of support s. S can be represented by the objects E→A and E'→A', with m(E)=s and m(E')=1−s. If relations exist among the focal elements, then additional objects have to be included in the AKB. For example, suppose A and B are disjoint focal elements, then we need to include the object $U \to A' \subseteq B'$ in the AKB. (Although focal elements in DST are sets, we view them as propositions to fit them into our formulation.) If the frame of discernment Θ is given, another way of representing the support functions, without resorting to using additional objects to specify the relations among focal elements, is to write: $A = \{\theta_1, \theta_2, \ldots, \theta_k\} \subseteq \Theta$ as $\theta_1 \subseteq \theta_2 \subseteq \ldots \subseteq \theta_k$.

In this case, we need only add, once and for all, the objects $U \to a' \subseteq b'$ for distinct a, $b \in \Theta$. DST employed Scheme 2 given in Section 2 to extend the κ-measure m and then normalized the result by dividing it by $1 - \tilde{m}(\sigma_\kappa(F))$. It can be shown that the orthogonal sum used in DST can be derived from the above representation. Although DST emphasized evidence in its formulation, like all other existing models, it did not distinguish between the evidence and the proposition it supports.

Section 4. Augmented Knowledge Base Inference Engine

In this section, we shall show how inference or reasoning is done in an AKB. From the above discussions, it is clear that, in an embodiment of this invention, the functions of the augmented knowledge base engine (AKBE) can be divided neatly into two phases. The first phase deals only with the AKB κ (or any desired subset thereof, in the case of distributed knowledge bases), while the second phase deals with the κ-measure and its extension. As noted earlier, it is possible to use more than one extension schemes in a single AKB. Moreover, depending on the extension scheme(s) used, it may not be necessary to complete the first phase before starting the second phase. In particular, the two phases, as well as the extension schemes, if two or more schemes are used simultaneously, maybe carried out in parallel to make the process more efficient.

The main thrust of the first phase of an AKBE is the evaluation of $\sigma_\kappa(L)$. By virtue of results given in Section 1, we need only provide a method for determining $\sigma_\kappa(F)$ for arbitrary AKB κ. Many such algorithms are given in Section 15 (Unification Algorithms).

The main thrust of the second phase of an AKBE is the computation of $\tilde{m}(\sigma_\kappa(F))$. This clearly depends on the scheme used for extending m. As stated earlier, the result in Section 2 can be used to provide a lower bound and an upper bound for $\tilde{m}(E)$ for any probabilistic extension of m as long as m itself is probabilistic. Unfortunately, after applying the theorem a few times, the lower and upper bound quickly approaches 0 and 1, respectively, yielding very minimal useful information. Nevertheless, both the lower and upper bounds can be computed easily, and thus it provides a very efficient way for bounding the value of $\tilde{m}(E)$.

Several extension schemes are given in Section 2. Clearly, all of those schemes are intended to be used to compute $\tilde{m}(E)$ directly, provided $E \in \tilde{\epsilon}_\kappa$, without any regard to the relations among the sets in $\tilde{\epsilon}_\kappa$ (e.g. Is $E_1$ a subset of $E_2$, or are they disjoint?). There are many other known extension schemes and/or conditioning/composition rules. However, they are either too restrictive, or have no clear semantics and thus suffer from various anomalies.

A promising approach is the use of the extension scheme based on constraint stochastic independence method mentioned earlier and discussed in detail below. It provides a unique point value for $\tilde{m}(E)$, and forms the basis for a new computational model of uncertain reasoning. A unique feature of this new reasoning scheme is its ability to deal with relationships among the bodies of evidences, or its capability to take into account constraints imposed on the bodies of evidences. This is a clear departure from all existing formalisms for uncertain reasoning, which are incapable of dealing with such constraints. This added feature can lead to more powerful, robust, accurate and/or refined characterizations of the knowledge base. In addition, because of its clear probabilistic semantics, virtually all of the known anomalies associated with existing knowledge-based systems disappear.

Although our discussion on AKBE focuses on $\sigma_\kappa$, the same method can be used for $\underline{\sigma}_\kappa$ or other appropriate functions. In addition, if κ is consistent (see Section 5), and both $\sigma_\kappa$, and $\underline{\sigma}_\kappa$ are considered, then one can determine an interval value $(\tilde{m}(\sigma_\kappa(L)), \tilde{m}(\underline{\sigma}_\kappa(L)))$ for any $L \in \mathcal{L}$.

In general, AKBs allow rules to be supported by bodies of evidences that are related to other bodies of evidences. For example, two different rules may be supported by the same body of evidences, or a rule is supported by E while another rule is supported by E'. If one needs to know which specific rules, not just which specific bodies of evidences, that are applied to obtain the desired results, such as in PROLOG-like query, $\Sigma_\kappa(L) = \{\omega \in \hat{\kappa} | r(\omega) \Rightarrow L\}$ can first be determined. Clearly, all the rules involve in the inference are included in $\Sigma_\kappa(L)$. One can then use the definition, together with the given constraints, to determine $\sigma_\kappa(L)$.

Providing explanations on how results were obtained by any knowledge-based system will go a long way in bolstering the user's confidence on the system. For AKBs, the explanation is built-in. All the rules that are involved in deducing the final results are given in $\Sigma_\kappa(L)$. Moreover, the overall body of evidences supporting L is given in $\sigma_\kappa(L)$. Furthermore, all constraints involved, when constraint stochastic independence method is employed, can be readily extracted during the second inference phase.

It is worth noting that the $\Sigma_\kappa(L)$ and/or $\sigma_\kappa(L)$ obtained in the first phase of the AKBE, contains a mountain of treasures (information) waiting to be exploited. We have seen how it can be used to determine the support of L, as well as, how to explain away L. Many other concepts, such as consistency, reliability, vulnerability, etc., which are central to many different complex systems, as well as, deception, which is central to knowledge-based systems, can also be formulated and determined via $\Sigma_\kappa(L)$, $\sigma_\kappa(L)$ and/or $\tilde{m}$ (see Section 5 below).

Section 5. Properties of AKB

FIG. 7 is a table of methods for testing and ensuring properties of AKB, according to an embodiment of the present invention.

In this section, certain basic properties of AKBs are presented together with methods for testing and ensuring that the AKB possesses the properties.

Let κ be an AKB. κ is consistent if and only if G=Ø, subject to $\mathcal{C}_\kappa$, whenever $$G \xrightarrow{d}_\kappa F.$$

$\mathcal{C}_\kappa$ is the collection of all constraints involving κ. This means that for consistent κ, if a rule is FALSE, then it is not supported by any evidences.

Consistency is an important issue involving an AKB. It specifies the internal consistencies of the contents of the AKB. For example, if both $E_1 \rightarrow A$ and $E_2 \rightarrow A'$ are in κ, then $E_1$ and $E_2$ should be disjoint for κ to be consistent. We need a higher order AKB to deal with inconsistencies (see Section 7). If an AKB is not consistent, then the (E→A) in κ may not be universally accepted. Inconsistency is closely related to reliability. It could also be a precursor of something important, such as deception, when dealing with knowledge bases not known for their inconsistencies.

AKBs associated with Probabilistic logic (N. J. Nilsson. Probabilistic logic. *Artificial Intelligence,* 28:71-87, 1986), Bayesian networks (Judea Pearl. *Probabilistic Reasoning in Intelligent Systems Networks of Plausible Inference.* Morgan Kaufmann, 1988) and Bayesian knowledge-bases (Eugene Santos, Jr. and Eugene S. Santos. A framework for building knowledge-bases under uncertainty. *Journal of Experimental and Theoretical Artificial Intelligence,* 11:265-286, 1999) are consistent. On the other hand, consistency is not strictly observed in Dempster-Shafer theory (G. Shafer. *A Mathematical Theory of Evidence.* Princeton University Press, 1976). This omission, together with its composition rule, can lead to certain anomalies (L. A. Zadeh. On the validity of Dempster's rule of combination of evidence. Technical Report 79/24, University of California, Berkeley, 1979; L. A. Zadeh. A mathematical theory of evidence (book review). *AI Magazines,* 55:81-83, 1984; L. A. Zadeh. A simple view of the Dempster-Shafer theory of evidence and its implication for the rule of combination. *AI Magazines,* 7:85-90, 1986).

In general, consistency imposed certain conditions that the E's should satisfy. Some criteria for consistency are given below:

Let κ be an AKB. The following statements are equivalent:
1. κ is consistent.
2. G=∅, subject to $\mathcal{C}_\kappa$, whenever $$G \xrightarrow{d}_\kappa F.$$

3. For every ω∈$\hat{\kappa}$, l(ω)=∅ whenever r(ω)=F.
4. $\sigma_\kappa(F)=\emptyset$.
5. $\underline{\sigma}_\kappa(T)=U$.
6. For every L∈$\mathcal{L}$, $\sigma_\kappa(L) \cap \sigma_\kappa(L')=\emptyset$.
7. For every L∈$\mathcal{L}$, $\underline{\sigma}_\kappa(L) \cup \underline{\sigma}_\kappa(L')=U$.
8. For every L∈$\mathcal{L}$, $\underline{\sigma}_\kappa(L) \subseteq \sigma_\kappa(L)$.

Any of the criteria above can be used to test and ensure that the AKB is consistent. As observed earlier, an inconsistent AKB is actually a higher order AKB. Although inconsistencies can be removed from an AKB κ by adding the constraint $\sigma_\kappa(F)=\emptyset$, this method may not be advisable since it could alter the nature of the AKB. Besides, all inconsistencies should be handled with care. They may occur due to errors. More importantly, they may occur due to possible deceptions (see below), especially if the AKB is not known to have inconsistencies.

Let κ be an AKB. κ is complete if and only if for every L∈$\mathcal{L}$, $\underline{\sigma}_\kappa(L) \subseteq \sigma_\kappa(L)$. κ is perfect if and only if for every L∈$\mathcal{L}$ $\underline{\sigma}_\kappa(L)=\sigma_\kappa(L)$.

Perfect AKBs are those AKBs whose support and plausibility for any L∈$\mathcal{L}$ are equal. This turns out to be a very powerful property.

Additional methods for testing and ensuring that an AKB is perfect are given below:

Let κ be an AKB. The following statements are equivalent:
1. κ is perfect.
2. For every L∈$\mathcal{L}$, $\underline{\sigma}_\kappa(L)=\sigma_\kappa(L)$.
3. κ is both consistent and complete.
4. κ satisfies the following conditions:
 a) $\sigma_\kappa(L')=[\sigma_\kappa(L)]'$;
 b) $\sigma_\kappa(L_1 \wedge L_2)=\sigma_\kappa(L_1) \cap \sigma_\kappa(L_2)$; and
 c) $\sigma_\kappa(L_1 \subseteq L_2)=\sigma_\kappa(L_1) \cup \sigma_\kappa(L_2)$ In light of 4 of the above result, if κ is perfect, then for every L∈$\mathcal{L}$, $\sigma_\kappa(L)$ is completely determined by $\sigma_\kappa(A)$, where A∈$\mathcal{L}_a$, and $\mathcal{L}_a$ is the collection of all atomic proposition in $\mathcal{L}$. An atomic proposition is a proposition that is indivisible, i.e., it cannot be expressed in terms of other propositions. A rule A is a combination of or formed of one or more atomic propositions.

We shall now present some other important properties involving AKBs, and show their possible applications.

Let κ be an AKB, m a κ-measure, $\tilde{m}$ an extension of m over $\bar{\epsilon}_\kappa$, $\lambda \subseteq \kappa$, and L∈$\mathcal{L}$.

$$\psi_\kappa(\lambda, L)=\tilde{m}(\sigma_\kappa(L))-\tilde{m}(\sigma_{\kappa-\lambda}(L))$$

$\psi_\kappa(\lambda, L)$ will be referred to as the contribution of λ over L. If μ∈κ, then we shall also write: $\psi_\kappa(\mu, L)$ for $\psi_\kappa(\{\mu\}, L)$.

The concept of contribution can be used to detect and overcome vulnerabilities, as well as, detect possible deceptions (see below).

Let κ be an AKB, μ∈κ and L∈$\mathcal{L}$. μ is essential support for L if and only if $\psi_\kappa(\mu, L)>0$.

Clearly, all the vulnerabilities of κ with respect to L can be determined from $S_\kappa(L)=\{\mu \in \kappa | \mu$ is an essential support for L$\}$, which can in turn be obtained from $\Sigma_\kappa(L)$. As a matter of fact, we can order the elements μ of $S_\kappa(L)$ in descending order of $\psi_\kappa(\mu, L)$. In this way, one can pinpoint all the major vulnerabilities of κ with respect to L. Sometimes, vulnerabilities are not due to a single element of κ. In this case, $\Sigma_\kappa(L)$ should be examined to determine group of elements of κ that may be the root cause of major vulnerabilities.

Detecting possible deceptions involving L can become more complicated since it involves human and/or another corrupted machine. Nevertheless, a method to start the detection process can be carried out by first determining the major single and/or multiple vulnerabilities with respect to L, as explained above, and carefully examining which of the major single and/or multiple vulnerabilities are plugged using questionable sources. In general, deceptions might involved altering, adding and/or deleting multiple elements of κ. For security purposes, no existing element of κ should be allowed to be removed without thorough investigation to assure that the element in question is useless, not appropriate and/or superseded. All changes should be introduced as new members of κ (deletion of (E→L)∈κ can be accomplished by temporarily adding the new member ∅→L to κ). A log should be provided for any changes, addition or physical deletion of any member of κ.

Section 6. Inductive Inference

Figure 8:
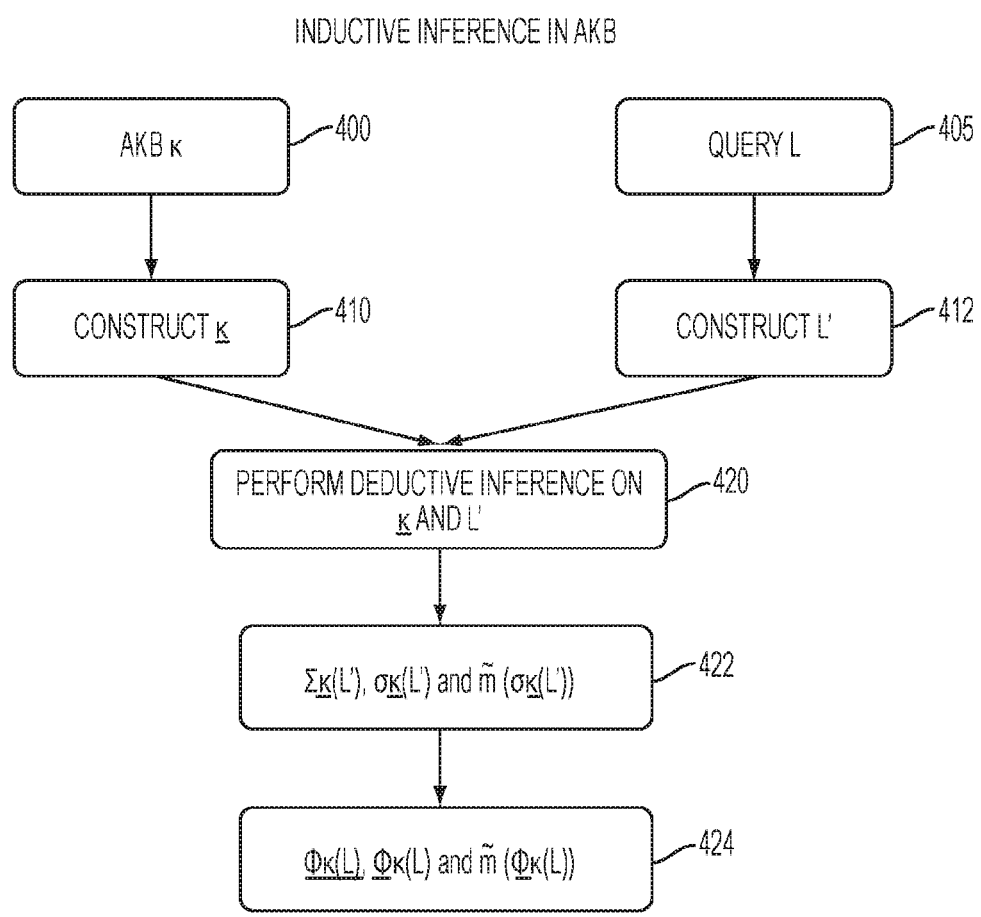
FIG. 8 is a flow diagram of inductive inference in AKB, according to an embodiment of the present invention.

FIG. 8 is flow diagram of inductive inference in AKB, according to an embodiment of the present invention.

Inductive inference comes in many different flavors and has been widely studied in the literature (Aidan Feeney and Evan Heit, editors. *Inductive Reasoning: Experimental, Developmental, and Computational Approaches*. Cambridge University Press, 2007; John H. Holland, Keith J. Holyoak, Richard E. Nisbett, and Paul R. Thaggard. *Induction:Process of Inference, Learning, and Discovery*. MIT Press, 1989). In this section, we provide a method for performing inductive inference in AKBs. The inductive inference presented in this document is not only more general (capable of handling uncertainties and/or incompleteness), but also more robust, than traditional inductive inference. Together with the results given above, AKB can serve as a unified framework for deductive and inductive reasoning. Furthermore, in view of the results that will be presented in this section, we can view deductive reasoning and inductive reasoning as dual of each other.

Let κ be an AKB, G⊆U and L∈$\mathcal{L}$.

$$G \xrightarrow{i}_\kappa L$$

(where i denotes inductive reasoning) if and only if there exists $L_0 \in \mathcal{L}$ where $L_0$ refers to a composite rule such that the target rule L⇒$L_0$ and G→$_\kappa L_0$.

This is equivalent to there exists ω∈$\hat{\kappa}$ is such that l(ω)=G and L⇒r(ω). Observe the difference between $$G \xrightarrow{i}_\kappa L \text{ and } G \xrightarrow{d}_\kappa L.$$

In other words, $$G \xrightarrow{i}_\kappa$$

L means there exists a composite object ω in the AKB κ (ω is formed from objects in κ), where G is the set of evidences associated with ω, and the rule associated with ω is implied by L.

$$G \xrightarrow{i}_\kappa L$$

is one of the key concepts for dealing with inductive reasoning and other aspects of AKBs. Among other things, it provides a natural way to show how a given $L \in \mathcal{L}$ is inductively related to $\kappa$. Let $\kappa$ be an AKB and $L \in \mathcal{L}$.

1. The inductive plausibility for L with respect to $\kappa$, (also denoted by $\phi_\kappa(L)$), is the smallest $G \subseteq U$ where $$G \xrightarrow{i}_\kappa L.$$

2. The inductive support for L with respect to $\kappa$, (also denoted by $\underline{\sigma}_\kappa(L)$), is equal to $[\phi_\kappa(L')]'$.

In other words, inductive plausibility for L with respect to $\kappa$ is the smallest set of evidences G such that $$G \xrightarrow{i}_\kappa L,$$

while inductive support for L with respect to $\kappa$ is the largest set of evidences G such that $$G \xrightarrow{i}_\kappa L'.$$

Let $\kappa$ be an AKB. Let $\omega \in \hat{\kappa}$. The complement $\omega'$ of $\omega$ is defined recursively as follows:
1. If $\omega = (E \rightarrow A)$ where $\omega \in \kappa$, then $\omega' = (E' \rightarrow A')$.
2. If $\omega_1, \omega_2 \in \hat{\kappa}$, then $(\omega_1 \subseteq \omega_2)' = \omega_1' \wedge \omega_2'$ and $(\omega_1 \wedge \omega_2)' = \omega_1' \vee \omega_2'$.

Clearly, for any composite object of $\omega$, $\omega'$ is obtained from $\omega$ by taking the complement of the set of evidences portion of $\omega$, and the negation of the rule portion of $\omega$. The complement $\omega'$ of $\omega$ is needed to show the relations between deductive inference and inductive inference.

Let $\Omega \subseteq \hat{\kappa}$. $\underline{\Omega} = \{\omega' | \omega \in \Omega\}$.
Let $\tau \subseteq \kappa$. $\underline{\tau} = \{\omega' | \omega \in \tau\}$. When $\underline{\kappa}$ is viewed as an AKB, then $\mathcal{C}_{\underline{\kappa}} = \mathcal{C}_\kappa$.

The following properties show that inductive support and inductive plausibility with respect to $\kappa$ are closely related to plausibility and support with respect to $\underline{\kappa}$. They also provide a method for computing the inductive support and inductive plausibility with respect to $\kappa$ using the Unification Algorithms (see Section 15) for computing the support and plausibility with respect to $\kappa$.

Let $\kappa$ be an AKB and $L \in \mathcal{L}$. $\phi_\kappa(L) = \underline{\sigma}_\kappa(L)$ and $\underline{\phi}_\kappa(L) = \sigma_{\underline{\kappa}}(L)$.

Clearly, reasoning using $\sigma_\kappa$ corresponds to deductive inference or reasoning. On the other hand, reasoning using $\phi_\kappa$ may be viewed as inductive inference or reasoning. $\phi_\kappa$ can be used for extracting new knowledge from $\kappa$. In view of the above results, $\underline{\kappa}$ may be viewed as the AKB induced by $\kappa$ using inductive inference. However, it should be observed that, even if $\kappa$ is consistent, new knowledge extracted from $\kappa$, need not be consistent with one another; i.e., $\underline{\kappa}$ need not be consistent. In the rest of this section, we shall provide necessary and sufficient conditions for the new knowledge extracted from $\kappa$ to be consistent.

In view of the previous paragraphs, inductive inference can be accomplished using deductive inference, as follows: construct the complement $\underline{\kappa}$ (410) from $\kappa$ (400), construct the negation L' (412) from L (405), perform deductive inference on $\underline{\kappa}$ and L' (420) to determine the support of L' with respect to $\underline{\kappa}$, and other items in (422), and then use the relation $\phi_\kappa(L) = \underline{\sigma}_\kappa(L)$ given above to compute inductive plausibility of L with respect to K, as well as other items (424).

Let $\kappa$ be an AKB. The following statements are equivalent:
1. $\kappa$ is i-consistent.
2. $G = U$, subject to $\mathcal{C}_\kappa$, whenever $$G \xrightarrow{i}_\kappa T.$$

3. For every $\omega \in \hat{\kappa}$, $l(\omega) = U$ whenever $r(\omega) = T$
4. $\phi_\kappa(T) = U$.
5. $\underline{\phi}_\kappa(F) = \emptyset$.
6. For every $L \in \mathcal{L}$, $\phi_\kappa(L) \cup \underline{\phi}_\kappa(L') = U$.
7. For every $L \in \mathcal{L}$, $\underline{\phi}_\kappa(L) \cap \underline{\phi}_\kappa(L') = \emptyset$.
8. For every $L \in \mathcal{L}$, $\underline{\phi}_\kappa(L) \subseteq \phi_\kappa(L)$.
9. $\underline{\kappa}$ is consistent.

Any of the criteria above can be used to test and ensure that the AKB is i-consistent. It follows from the above results that if $\kappa$ is i-consistent, then $\underline{\kappa}$ is consistent. In this case, the new knowledge extracted from $\kappa$ will be consistent with each other.

Since $\kappa$ is i-consistent if and only if $\underline{\kappa}$ is consistent, in the same manner, we shall say that $\kappa$ is i-xxx if and only if $\underline{\kappa}$ is xxx. Moreover, we shall say that $\kappa$ is dual-xxx if and only if both $\kappa$ and $\underline{\kappa}$ are xxx. Therefore, all results given in Section 5 can be transformed into corresponding results involving i-complete and/or i-perfect using the above results.

Let $\kappa$ be an AKB. $\kappa$ is monotonic if and only if for every $\omega_1, \omega_2 \in \hat{\kappa}$, if $r(\omega_1) \Rightarrow r(\omega_2)$, then $l(\omega_1) \subseteq l(\omega_2)$.

Let $\kappa$ be an AKB. The following statements are equivalent:
1. $\kappa$ is monotonic.
2. $\underline{\kappa}$ is monotonic.
3. For every $\omega_1, \omega_2 \in \hat{\kappa}$, if $r(\omega_1) \equiv r(\omega_2)$, then $l(\omega_1) = l(\omega_2)$.
4. For every $\omega \in \hat{\kappa}$, $l(\omega) = \sigma_\kappa(r(\omega))$.
5. For every $\omega \in \hat{\kappa}$, $l(\omega) = \phi_\kappa(r(\omega))$.
6. For every $\omega \in \hat{\kappa}$, $\sigma_\kappa(r(\omega)) = \phi_\kappa(r(\omega))$.
7. For every $L \in \mathcal{L}$, $\sigma_\kappa(L) \subseteq \phi_\kappa(L)$.
8. For every $L \in \mathcal{L}$, $\sigma_\kappa(L) \subseteq \underline{\sigma}_\kappa(L)$.
9. $\tilde{\kappa}$ is consistent, where $\tilde{\kappa} = \kappa \cup \underline{\kappa}$, where $\mathcal{C}_{\tilde{\kappa}} = \mathcal{C}_\kappa$.

Any of the criteria above can be used to test and ensure that the AKB is monotonic.

If $\tilde{\kappa}$ is consistent, then the original knowledge in $\kappa$ and the newly extracted knowledge associated with $\underline{\kappa}$ are all consistent with each other.

Section 7. Higher Order AKB

FIG. 9 is a flow diagram of constructing consistent higher order AKBs, according to an embodiment of the present invention. FIG. 9 is a list of 3 higher order AKBs and how they are constructed. All 3 types are described in this section.

In this section, unless otherwise stated, we shall assume that n is a positive integer. We shall now present higher order AKBs using induction.

1. A 1-st order AKB is an AKB (as defined above).
2. Let $\mathcal{K}_0$ be an n-th order AKB. An (n+1)-th order AKB $\mathcal{K}$ is a finite collection of objects of the form $G \rightarrow \mu$, where $G \subseteq U$ and $\mu \in \mathcal{K}_0$. G will be referred to as the reliability of $\mu$, and $\mathcal{K}$ an immediate extension of $\mathcal{K}_0$.
3. A general AKB is a n-th order AKB.

Let $\mathcal{K}$ be a general AKB. Since the objects in $\mathcal{K}$ have the same form as objects in an AKB, many of the basic concepts and notations for AKB can be carried over to $\mathcal{K}$, e.g., $\hat{\mathcal{K}}$, $\mathcal{E}_{\mathcal{K}}$, r( ) l( ), etc. Moreover, $\mathcal{C}_{\mathcal{K}}$ is the collection of all relations among the sets or bodies of evidences involved in $\mathcal{K}$ and/or in $\mathcal{A}_{\mathcal{K}}$.

Let $\mathcal{K}$ be an n-th order AKB and n>1. $\mathcal{K}_{\downarrow} = \{l(\omega) \cap l(r(\omega)) \to r(r(\omega)) | \omega \in \mathcal{K}\}$. Observe the $\mathcal{K}_{\downarrow}$ is an (n−1)-th order AKB. This provides a way to reduce an n-th order AKB into an (n−1)-th order AKB. Moreover, $\mathcal{K}$ is consistent if and only if $\mathcal{K}_{\downarrow}$ is consistent.

In the rest of this section, we shall present several methods for constructing consistent second order AKBs. It includes the constructions of $\mathcal{K}_{\kappa}^0$, $\mathcal{K}_{\kappa}^1$, and different varieties of $\mathcal{K}_{\alpha}^2$.

Let κ be an AKB. $\mathcal{K}_{\kappa}^0 = \{\underline{\sigma}_{\kappa}(r(\mu)) \to \mu | \mu \in \kappa\}$.

If κ is a deterministic AKB, then $\mathcal{K}_{\kappa}^0$ contains only the elements of κ which are consistent with all the other elements of κ. Thus, for example, if κ contains both L is TRUE and L' is TRUE, then neither elements will be included in $\mathcal{K}_{\kappa}^0$.

Let κ be an AKB and $\mathcal{K}$ is a second order AKB.

$\mathcal{K}$ is an ideal immediate extension of κ if and only if $\mathcal{K} = \{G_{\mu} \to \mu | \mu \in \kappa\}$ and for every $\tau \in M_{\kappa}$, $\alpha_{\kappa}(\tau) \subseteq \cup_{\mu \in \tau} G_{\mu}'$ where $\alpha_{\kappa}(\tau) = \cap_{\mu \in \tau} l(\mu)$ and $\beta_{\kappa}(\tau) = \wedge_{\mu \in \tau} r(\mu)$;

τ is F-minimal if and only if (i) $\beta_{\kappa}(\tau) = F$ and (ii) $\beta_{\kappa}(\tau_0) \neq F$ whenever $\tau_0$ is a proper subset of τ; and $M_{\kappa}$ is the collection of all F-minimal subset of κ.

The above definitions and notations are needed to properly define $\mathcal{K}_{\kappa}^1$ and $\mathcal{K}_{\kappa}^2$.

Let κ be an AKB. $\mathcal{K}_{\kappa}^1 = \{(\gamma(\mu))' \to \mu | \mu \in \kappa\}$, where for μ∈κ, $\Gamma_{\kappa}(\mu) = \{\tau \in M_{\kappa} | \mu \in \tau\}$ and $\gamma(\mu) = \cup_{\tau \in \Gamma_{\kappa}(\mu)} \alpha_{\kappa}(\tau)$ if $\Gamma_{\kappa}(\mu) \neq \emptyset$. Otherwise, $\gamma(\mu) = \emptyset$.

Given an AKB κ. Construct $\mathcal{K}_{\kappa}^2$ of κ.
1. Let $\mathcal{K} = \emptyset$.
2. For each $\tau \in M_{\kappa}$ and each μ∈τ, let G(μ,τ) be a new symbol in $\in \mathcal{K}_{\kappa}^0$.
3. For each $\tau \in M_{\kappa}$, add to $\mathcal{C}_{\mathcal{K}}$ the constraint that the collection $\{G(\mu,\tau)|\mu \in \tau\}$ forms a partition of $\alpha_{\kappa}(\tau)$.
4. For each μ∈κ, add to $\mathcal{K}$ the object $\cap_{\tau \in \Gamma_{\kappa}(\mu)}(G(\mu,\tau))' \to \mu$.
5. Return $\mathcal{K}$.

Let κ be an AKB and $\mathcal{K}$ an ideal immediate extension of κ. If m is a κ-measure, then m can be extended to a $\mathcal{K}_{\downarrow}$-measure M. In particular, if $\mathcal{K} = \mathcal{K}_{\kappa}^2$, then we can assign M(G(μ,τ)) to be any nonnegative values, for every $\tau \in M_{\kappa}$ and μ∈τ; provided $\Sigma_{\mu \in \tau} M(G(\mu,\tau)) = 1$ for every μ∈κ. More information and/or human intervention will be needed in order to assign specific values for M(G(μ,τ)). However, if no such information is forthcoming, assign M(G(μ,τ))=1/|τ|

The above discussions show how one could construct second order AKBs to guarantee consistency in κ, $\underline{\kappa}$ and/or $\ddot{\kappa}$. It follows from the above results that new knowledge can be extracted from κ in meaningful ways. Thus, AKBs provides a computational framework for knowledge extraction and data mining. Moreover, the selection of different ideal immediate extension for an AKB gives rise to different knowledge extractions/data mining schemes (See Section 8).

Section 8. Free-Form Database

Figure 10:
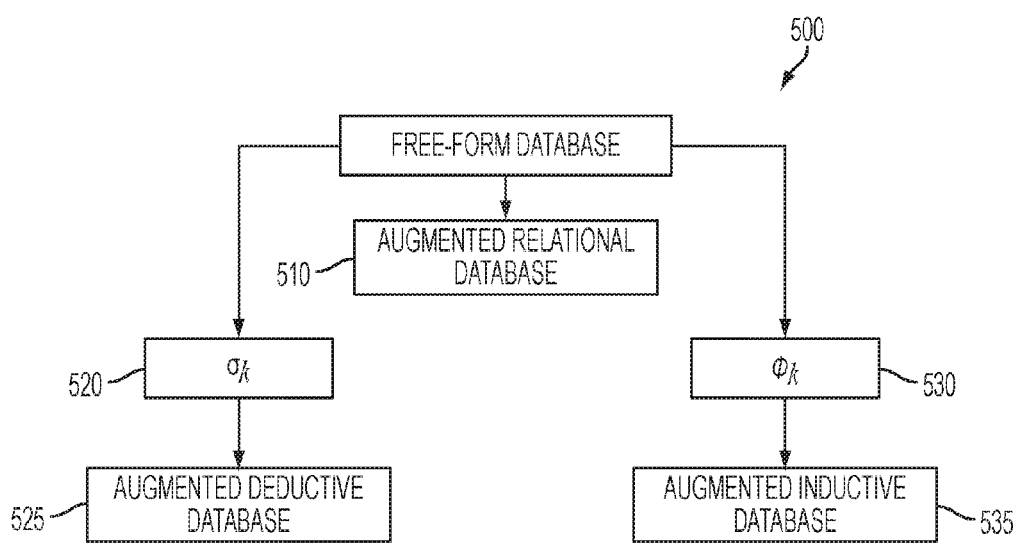
FIG. 10 is a diagram for illustrating the relations for generating a free-form database, augmented relational database, augmented deductive database and augmented inductive database, according to an embodiment of the present invention.

FIG. 10 is a diagram for illustrating the relations for generating a free-form database, according to an embodiment of the present invention. In this section, we provide methods for constructing free-form databases (FFDB), which are special type of AKBs, and show how relational databases can be transformed into FFDBs. Among other things, we show that by so doing, one can automatically deals with uncertainties and/or incompleteness in relational databases in a natural manner. Moreover, we shall use FFDBs to construct deductive and inductive databases.

Let κ be an AKB (over $\mathcal{L}$ and U). κ is a free-form database (FFDB) (500) if and only if every atomic proposition in $\mathcal{L}$ is of the form v=$\bar{v}$, where v is a variable and $\sqrt{v} \in V_v$, the collection of all possible values for v. In addition, every variable v in an FFDB satisfies the following two conditions:

1. $((v = \bar{v}_1) \wedge (v = \bar{v}_2)) \equiv F$ whenever $\bar{v}_1, \bar{v}_2 \in V_v$ and $\bar{v}_1 \neq \bar{v}_2$; and
2. $V_{\bar{v} \in V_v}(v = \bar{v}) \equiv T$;

Observe that a relational database $\mathcal{D}$ is made up of a finite set of relations. Consider a relation $\mathcal{R}$ in $\mathcal{D}$ with header $A_1, \ldots, A_k$. Then any member of $\mathcal{R}$ can be represented in the form:

$$(A_1 = a_1) \wedge \ldots \wedge (A_k = a_k) \Rightarrow (\mathcal{D} = T), \quad (1)$$

where ($\mathcal{D}$=T) can be interpreted as the relation is in the database $\mathcal{D}$, and $\Rightarrow$ is material implication in $\mathcal{L}$.

Let $\mathcal{D}$ be a relational database. $\kappa_{\mathcal{D}}$ is smallest FFDB which contains the collection of all U→p, over all relations $\mathcal{R}$ in $\mathcal{D}$, where p is an expression of the form given in (1) above.

Only deterministic relational databases are defined above. However, in the new representation, uncertainties and/or incompleteness could be readily incorporated in $\kappa_{\mathcal{D}}$ by changing the U in $\kappa_{\mathcal{D}}$ to any appropriate subset E of U. Moreover, by using the above representation, not only is it possible to specify which relation is in the database, but it is also possible to specify which relation is NOT in the database by setting ($\mathcal{D}$=F) instead of ($\mathcal{D}$=T).

The dependencies/independencies among the data are of paramount importance in traditional databases, since these databases are subject to constant updating. Violations of these dependencies/independencies are the main sources of anomalies in these databases. The dependencies can be characterized by one-to-one and/or many-to-one relationships (dependencies). A many-to-one dependency (or functional dependency) can be expressed as:

$$\wedge_{i=1}^{k}(v_i^L = v_i^{-L}) \Rightarrow (\wedge_{j=1}^{n}(v_j^R = v_j^{-R}) \mathcal{D}(\wedge = T), \quad (2)$$

where $v_i^{-L} \in V_{v_i^L}$ and $v_j^{-R} \in V_{v_j^R}$ for all i=1, 2, . . . , k and j=1, 2, . . . , n. A one-to-one dependency can be expressed as two many-to-one dependencies.

Expression (2) reduces to expression (1) when n=0. The left hand side of expression (2), for n≥0, represent independencies. In other words, the values of the variables $v_1^L, v_2^L, \ldots, v_k^L$ in (2) are arbitrary and independent of each other, and the set $\{v_1^L, v_2^L, \ldots, v_k^L\}$ of variables forms a key. The concept of multi-valued dependency and join dependency (R. Fagin. A normal form for relational databases that is based on domain and keys. *ACM Transaction on Database Systems*, 6:387-415, 1981) can be viewed as some sort of independencies/dependencies, and thus can be reformulated as such.

Let $\mathcal{D}$ be a relational database. $\kappa_{\tilde{\mathcal{D}}}$ is smallest FFDB which contains the collection of all U→p, where p is an expression of the form given in (2) above, with n≥0, over all dependencies/independencies in $\mathcal{D}$. In addition, $\bar{\kappa}_{\mathcal{D}} = \kappa_{\mathcal{D}} \cup \kappa_{\tilde{\mathcal{D}}}$. In this case, we shall also say that κ is an augmented relational database (510).

The expression given by (2) above can be decomposed into the n expressions: $(\wedge_{i=1}^{k}(v_i^L = v_i^{-L})) \Rightarrow (v_j^R = v_j^{-R})$, j=1, 2, . . . , n, and the expression $(\wedge_{i=1}^{k}(v_i^L = v_i^{-L})) \Rightarrow (\mathcal{D} = T)$.

Each of these expressions, after decomposition, is a Horne clause. Since expressions given by (1) are also Horne clauses, therefore unification for any augmented relational database can be carried out in polynomial time.

The power of FFDBs is manifested not just in its capability and flexibility in representing relational databases (Amihai Motro. Imprecision and incompleteness in relational databases: Survey. *Information and Software Technology*, 32(9): 279-588, 1990; S. K. Lee. An extended relational database model for uncertain and imprecise information. *Proceedings* of *VLDB*, pages 211-220, 1992) with uncertainties and/or incompleteness, but also, as is shown below, in its ability to represent any deductive database (Raymond T. Ng. Reasoning with uncertainty in deductive databases and logic programs. *International Journal of Uncertainty, Fuzziness and Knowledge-based Systems*, 5(3):261-316, 1997) under uncertainty, i.e, augmented deductive database. Moreover, the concept of FFDB lends itself to the construction of augmented inductive databases. These databases can serve as formal framework for extracting new information from relational databases.

Clearly, an augmented deductive database, i.e., a deductive database centered on the relational database $\mathcal{D}$, can be represented by a FFDB $\kappa$, where $\kappa_\mathcal{D} \subseteq \kappa$. Using such a representation, the full force of the results obtained for AKBs can be applied to deductive databases. Therefore, unlike existing deductive databases, the augmented deductive database is capable of handling full-fledge uncertainties and/or incompleteness (520 and 525). According to an aspect of an embodiment, at 520, the deduction of 220 in FIG. 3 is applied to FFDB to obtain augmented deductive databases. According to an aspect of an embodiment, at 530, an inductive version of 230, defined in Paragraph 137, is applied to FFDB to obtain augmented inductive databases.

Consider an FFDB $\kappa$ where $\kappa_\mathcal{D} \subseteq \kappa$ and $\mathcal{D}$ is a relational database. If inductive reasoning (see Section 6) are employed instead of deductive reasoning, i.e., using $\phi_\kappa$ instead of $\sigma_\kappa$, then we have an augmented inductive database (530 and 535). Unlike deductive databases, we are not interested in searching, deducing, and/or generating views for inductive databases. Instead, we are interested in acquiring possible new knowledge from the database, i.e., data mining.

Most FFDBs are consistent. Nevertheless, $\underline{\kappa}$ may not be consistent. Thus, the construction of second order AKBs associated with $\kappa$ given in Section 7 is central to data mining in a relational database.

As discussed in Section 7, there are many different ways to guarantee consistency by selecting different associated second order AKBs. The different selections give rise to various natural schemes that can be used in data mining.

From the above discussions, it is clear that augmented inductive database can serve as general framework and formal model for knowledge acquisition and data mining in relational databases, with or without uncertainties and/or incompleteness.

Section 9. Average and Stochastic Independence

The main objective of the rest of this document is to show how to extend the measure m, with domain $\epsilon$, to $\tilde{m}$, with domain $\tilde{\epsilon}$. We are particularly interested in those cases where both m and $\tilde{m}$ are probability measures. This problem is central to many applications, in particular, reasoning in a knowledge-based system involving uncertainties and/or incompleteness, such as AKBs.

In the rest of this document, we shall denote by $\mathcal{J}$ the set of all non-negative integers, and denote by $\mathcal{J}^+$ the set of all positive integers.

Let us interpret the probabilities as frequencies. In other words, let $\epsilon \subseteq 2^U$ ($\epsilon$ is a subset of the universal set U), |U|=n (the universal set U has n elements), and let m denotes a function from $\epsilon$ into [0, 1] such that for every E in $\epsilon$, m(E)=k/n, where k=|E|. (|E| denotes the cardinality of E, i.e., the number of elements in E). Thus, m is a probability measure over $\epsilon$, and m(E) represents the probability of E.

If the sets in $\epsilon$ are explicitly specified, the problem of extending a measure m to $\tilde{m}$ can be based upon determining the cardinality of any set in $\tilde{\epsilon}$. Unfortunately, this might not be the case. If E is in $\epsilon$ and |E|=k, then E can stand for any subset of U with cardinality k, subject to possibly some other constraints which will be discussed in subsequent sections.

A natural probabilistic extension for a measure m with domain $\epsilon$ to $\tilde{m}$ with domain $\tilde{\epsilon}$ can be obtained by taking the average of the probabilities of all allowable sets in $\tilde{\epsilon}$.

Let $\epsilon \subseteq 2^U$, and A, B$\in \epsilon$. Let |U|=n, |A|=a and |B|=b. Assume that A can represent any subset of U whose cardinality is a, and B can represent any subset of U whose cardinality is b. Then the average probability of A∩B is given by:

$$\tilde{m}(A \cap B) = \frac{\sum_i \left[\binom{n}{a}\binom{a}{i}\binom{n-a}{b-i}\frac{i}{n}\right]}{\binom{n}{a}\binom{n}{b}} = \frac{\binom{n-1}{a-1}\binom{n-1}{b-1}}{\binom{n}{a}\binom{n}{b}} = \frac{a}{n} \times \frac{b}{n} = m(A)m(B)$$

The probability of any E$\in \epsilon$ above can be determined in a similar manner. In particular, it can be shown that $\tilde{m}(A \cap B')$=m(A) [1−m(B)] and $\tilde{m}(A \cup B)$=m(A)+m(B)−m(A)m(B).

Under the assumption that no constraints are imposed, the average method used to compute $\tilde{m}$ turns out to be the same as Scheme 2 given above. On the other hand Scheme 2 is based on the implicit assumption that the sets in $\epsilon$ are stochastically independent. Because of this, Scheme 2 fails completely if constraints exist among the sets in $\epsilon$. If constraints exist, the sets may no longer be stochastically independent. For example, under Scheme 2, $\tilde{m}(A \cap B)$=m(A) m(B) for all A and B, regardless, even in the cases where A $\subseteq$ B or A∩B=∅.

Constraints among the sets in $\epsilon$ could be inherent in most applications. The average method discussed above will still work even when such constraints exist. This will be examined in detail in the subsequent sections. Indeed, as we shall see below, using the average method, a new measure over $\epsilon$ may be created which takes into consideration one or more of (e.g., all) the constraints involved; and under the new measure, the sets in $\epsilon$ may be viewed as stochastically independent. For this reason, we shall refer to this new method as the constraint stochastic independence method.

The constraint stochastic independence method is the basis of a new computational model of uncertain reasoning—augmented reasoning. One of the important advantages of this method is its ability to deal with relationships among the bodies of evidences, or its capability to take into account constraints imposed on the bodies of evidences. For knowledge-based systems, this provides a unique mechanism to resolve relationships among the bodies of evidences. As stated earlier, this is a clear departure from all existing knowledge bases, which are incapable of supporting such constraints. This added feature can lead to more powerful, robust, accurate and/or refined characterizations of knowledge bases.

Section 10. Constraints

Let $\epsilon \subseteq 2^U$, and A, B, C$\in \epsilon$, where the cardinality of U, A, B and C are n, a, b and c, respectively. Suppose the only constraint is (A∪B)∩C=∅. (This is equivalent to the two constraints A∩C=∅ and B∩C=∅.) In other words, A, B and C can represent any subsets of U with cardinality a, b and c, respectively, satisfying (A∪B)∩C=∅. In this case, provided m(A)+m(C)≤1 and m(B)+m(C)≤1, the average probability of A∩B can be computed as follows:

$$\tilde{m}(A \cap B) = \frac{\sum_i \left[\binom{n}{a}\binom{a}{i}\binom{n-a}{b-i}\frac{i}{n}\right]}{\binom{n}{a}\binom{n}{b}} = \frac{\binom{n-1}{a-1}\binom{n-1}{b-1}}{\binom{n}{a}\binom{n}{b}} = \frac{m(A)m(B)}{1-m(C)}$$

The above example illustrates the roles constraints play in the extension of m to $\tilde{m}$, as well as, the restrictions constraints imposed on the values of the original m.

It is clear from the above discussions that we do not have to be interested in the specific subsets of U. Each member E in $\epsilon$ represents a potential subset of U where |E| is fixed and E satisfies the constraints specified. The notation $\epsilon \subseteq 2^U$ does not accurately reflect this concept. Therefore, in an embodiment of this invention, we shall introduce the new notation $\epsilon \triangleleft 2^U$, together with certain related new concepts.

In the new notation $\epsilon \triangleleft 2^U$, we can view each member of $\epsilon$ as a set variable which can be assigned certain subsets of U. For each E$\in\epsilon$, all subsets of U that can be assigned to E should have the same cardinality. This common cardinality will be denoted by |E|.

Given $\epsilon \triangleleft 2^U$, $\epsilon$ is completely defined only if |E| is specified for every E$\in\epsilon$. Alternatively, we can specify a function m from $\epsilon$ into [0, 1] and let |E|=m(E)×|U| for all E$\in\epsilon$. Observe that m(E) is the probability of any subset of U that can be assigned to E. We shall refer to m as a measure over $\epsilon$, and denote by $|\bullet|_m$ the cardinality induced by m, i.e., $|E|_m$=m(E)×|U| for all E$\in\epsilon$. Clearly, if m(E)=0, then E can only be assigned the subset Ø; and if m(E)=1, then E can only be assigned the subset U. For simplicity, we shall also denote by Ø (U) the set variable that can be assigned only the set Ø(U).

The members of $\epsilon$, where $\epsilon \triangleleft 2^U$, may be subject to certain constraints as illustrated above. Each constraint imposed further restrictions on the subsets of U that can be assigned to the set variables in $\epsilon$. It is clear from the above example that given a probability measure m and a collection of constraints $\mathcal{C}$ for $\epsilon$, some additional conditions may have to be imposed to insure that m and $\mathcal{C}$ are compatible.

More formally, we start with a collection $\epsilon$ of objects. The collection $\tilde{\epsilon}$ is defined recursively as follows:
1. If E$\in\epsilon$, then E is in $\tilde{\epsilon}$.
2. If Z, $Z_1$, $Z_2 \in \tilde{\epsilon}$, then Z', $Z_1 \cup Z_2$ and $Z_1 \cap Z_2$ are in $\tilde{\epsilon}$.

A constraint for $\epsilon$ is an expression of the form $Z_1$ rel $Z_2$, where $Z_1$, $Z_2 \in \tilde{\epsilon}$ and rel is one of the following relational operators: $\subseteq, \nsubseteq, \subset, \not\subset, \supseteq, \nsupseteq, \supset, \not\supset, =, \neq$.

A complete instantiation $\zeta$ of $\epsilon$ is a mapping from $\epsilon$ into $2^U$. If $\zeta$ is a complete instantiation of $\epsilon$, and W any expression or relation involving members of $\epsilon$, then $\zeta(W)$ is the expression or relation, obtained by replacing each E$\in\epsilon$ that occurred in W by $\zeta(E)$. In particular, if W is a constraint for $\epsilon$, then $\zeta(W)$ is the set relation, obtained by replacing each E$\in\epsilon$ that occurred in W by $\zeta(E)$. If $\zeta$ is a complete instantiation of $\epsilon$, and $\mathcal{C}$ is a collection of constraints for $\epsilon$, then $\zeta(\mathcal{C})$ is the collection of all $\zeta(W)$ where W$\in\mathcal{C}$. Let $\mathcal{C}$ be a collection of constraints for $\epsilon$, and W a constraint for $\epsilon$. W is derivable from $\mathcal{C}$ if and only if for all complete instantiation $\zeta$ of $\epsilon$, $\zeta(W)$ follows from $\zeta(\mathcal{C})$). Let $\mathcal{C}_1$ and $\mathcal{C}_2$ be collections of constraints for $\epsilon$. $\mathcal{C}_1$ and $\mathcal{C}_2$ are equivalent if and only if for every constraint W for $\epsilon$, W is derivable from $\mathcal{C}_1$ whenever W is derivable from $\mathcal{C}_2$, and vice versa.

A complete definition of $\epsilon \triangleleft 2^U$ requires the specification of a collection $\mathcal{C}$ of constraints for $\epsilon$ ($\mathcal{C}$ may be empty, i.e., no constraint is imposed on $\epsilon$), and a measure m over $\epsilon$. A measure m over $\epsilon$ is a function from $\epsilon$ into [0, 1] such that for every E$\in\epsilon$, $|E|_m$=|U|×m(E)$\in \mathcal{J}$.

A complete instantiation $\zeta$ of $\epsilon$ is legitimate over m and $\mathcal{C}$ if and only if for each E$\in\epsilon$, $|\zeta(E)|=|E|_m$, and for every W$\in\mathcal{C}$, $\zeta(W)$ holds.

Let m be a measure over $\epsilon$ and $\zeta$ a legitimate complete instantiation of $\epsilon$ over m and $\mathcal{C}$. Let $\zeta_m$ be a function from $\zeta(E)=\{\zeta(E)|E\in\epsilon\}$ into [0, 1], where $\zeta_m(\zeta(E))$=m(E). Clearly, $\zeta_m$ is a probability measure over $\zeta(E)$.

If there is at least one complete instantiation legitimate over m and $\mathcal{C}$, then m and $\mathcal{C}$ are compatible (or m is compatible with $\mathcal{C}$). $\mathcal{C}$ is consistent if and only if m and $\mathcal{C}$ are compatible for some measure m over $\epsilon$. The issue of compatibility is addressed in Section 13 below.

Let $\mathcal{C}$ be a collection of constraints for $\epsilon \triangleleft 2^U$, and m a measure over $\epsilon$. Let W be a relation involving m and members of $\epsilon$. W is valid if and only if for all complete instantiation $\zeta$ of $\epsilon$ legitimate over m and $\mathcal{C}$, $\zeta(W)$ holds.

In what follows, if $\mathcal{C}$ is a collection of constraints for $\epsilon \triangleleft 2^U$, then $\mathcal{C}$ is assumed to be consistent. Moreover, given $\epsilon \triangleleft 2^U$, if the concepts or results hold for arbitrary $\mathcal{C}$, then $\mathcal{C}$ will not be specified. In other words, no $\mathcal{C}$ doesn't mean that $\mathcal{C}$ is empty. Similarly, if the concepts or results hold for arbitrary m, then m will not be specified.

Let $\epsilon \triangleleft 2^U$, $\mathcal{C}$ a collection of constraints for $\epsilon$, and m a measure over $\epsilon$ which is compatible with $\mathcal{C}$. $\tilde{m}$ is the function from $\tilde{\epsilon}$ into [0, 1], such that for every E$\in\tilde{\epsilon}$, $\tilde{m}$(E) is the average of all $|\zeta(E)|$, where $\zeta$ is taken over all complete instantiations of $\epsilon$ which are legitimate over m and $\mathcal{C}$.

Clearly, in the above definition, the extension of m to $\tilde{m}$ corresponds to using the average for finding the probability of the new set. The compatibility of m and $\mathcal{C}$ guarantees that $\tilde{m}$ is a 'probability measure'.

In both the examples given above, $\tilde{m}(A \cap B)$ is well-defined or unique, since their values depend solely on the probabilities of the sets which are involved. However, this is not true in general.

It can be shown that inclusion of the relational operators of the types $\neq, \nsubseteq, \not\subset, \nsupseteq$ or $\not\supset$, in a collection of constraints for $\epsilon$, may cause the extension $\tilde{m}$ of m to be ill-defined, i.e., not well-defined.

In addition, for the extension $\tilde{m}$ to be well-defined, all constraints of the form $B_1 \cap B_2 \cap \ldots \cap B_l = \emptyset$, where l>2, should be derivable from other constraints. In other words, one need only considers disjoint relations or constraints of the form A$\cap$B=Ø. Unfortunately, as we shall see in the next section, this restriction, together with the restrictions given below, are not sufficient to guarantee that the extension will be well-defined (i.e., the extension will depend solely on the individual probabilities).

There are many possible constraints or relations among the elements in $\epsilon \triangleleft 2^U$, which do not contain relational operators of the types $\neq, \nsubseteq, \not\subset, \nsupseteq$ and $\not\supset$. These constraints are listed below:

1. (disjoint) In view of remark given above, an example intersection involving only two members of $\epsilon$ is described. Let A, B$\in\epsilon$. Since A'$\cap$B'=Ø is equivalent to A$\cup$B=U, all such relationships will be replaced by equivalent relationships discussed below (Case 6) and dealt with accordingly. In addition, A$\cap$B'=Ø is equivalent to A$\subseteq$B. These relations will be converted to subset relations (case 2) and dealt with accordingly. Thus, we shall restrict our attention only to disjoint relations of the form A$\cap$B=Ø where both A and B$\in\epsilon$. In addition, if A $\subseteq$ B and B$\cap$C=Ø, then A$\cap$C=Ø. Thus, it is essential to capture these implied disjoint relations.

2. (subset) Let A, B$\in\epsilon$. Clearly,
A $\subseteq$B' is equivalent to A$\cap$B=Ø (Case 1 above);
A'$\subseteq$B is equivalent to A$\cup$B=U (Case 6 below); and
A'$\subseteq$B' is equivalent to B$\subseteq$A.

Therefore, it is only necessary to consider $A \subseteq B$ where $A$, $B \in \epsilon$. However, $\subseteq$ is a transitive relation. Thus, it is essential that we captured most of, or all, or a number of according to application criteria, the subset relations, whether they are explicit, implicit or derived. Moreover, subset relations could give rise to equality relations. These equality relations (case 3) should be captured and dealt with accordingly.

3. (equality) Let $A$, $B \in \epsilon$. If $A=B$, then we can remove $B$ from $\epsilon$ and replace all occurrences of $B$ by $A$, and all occurrences of $B'$ by $A'$. Alternatively, $A=B$ can be replaced by $|A|=|B|$, and either $A \subseteq B$ or $B \subseteq A$. (If either $A \subseteq B$ or $B \subseteq A$ is implied by other constraints, then replace $A=B$ with $|A|=|B|$.) $A=B'$ is equivalent to $\{A, B\}$ is a partition of $U$, which is Case 4 below. Furthermore, $A=\emptyset$ can be replaced by $|A|=0$, and $A=U$ can be replaced by $|A|=1$.

4. (partition) $\{A_1, A_2, \ldots, A_k\}$ is a partition of $A_0$ if and only if the following conditions hold:
   a. $A_i \cap A_j = \emptyset$ for all $1 \leq i, j \leq k$ and $i \neq j$;
   b. $A_i \subseteq A_0$ for $1 \leq i \leq k$; and
   c. $|A_0|=|A_1|+|A_2|+\ldots+|A_k|$.

Hence, all partition relations can be replaced by disjoint relations and subset relations, plus imposing certain conditions on the measure m.

5. ($A \cap B = C$) If $A \cap B = C \neq \emptyset$, then extend $\epsilon$ to include the objects $G_1$ and $G_2$, where $|G_1|=|A|-|C|$ and $|G_2|=|B|-|C|$. In essence, we are trying to decompose A and B into the sets $A = G_1 \cup C$ and $B = G_2 \cup C$. Clearly, $A \cap B = C$ is completely characterized by the values assigned to $|G_1|$ and $|G_2|$, and the facts that $\{C, G_1\}$ is a partition of A, and $\{C, G_2\}$ is a partition of B.

6. ($A \cup B = C$) If $A \cup B = C$, then extend E to include the objects $G_0$, $G_1$ and $G_2$, where $|G_0|=|A|+|B|-|C|$, $|G_1|=|A|-|G_0|$, and $|C_2|=|B|-|G_0|$. In essence, we are trying to decompose A and B into the sets $G_0 = A \cap B$, $G_1 = A - G_0$ and $G_2 = B - G_0$. Clearly, $A \cup B = C$ is completely characterized by the values assigned to $|G_0|$, $|G_1|$ and $|G_2|$; the three sets $G_0$, $G_1$ and $G_2$ are pairwise disjoint; and the facts that $\{G_0, G_1\}$ is a partition of A, and $\{G_0, G_2\}$ is a partition of B. In view of Cases 1 and 2 above, the case $C=U$ is of particular significance.

7. (intersection) $A_0 = A_1 \cap A_2 \cap \ldots \cap A_k$ is equivalent to $A_1 \cap A_2 \cap \ldots \cap A_k \cap A_0' = \emptyset$. In view of the above result, only the case $k=2$ will be considered. This is equivalent to Case 5 above.

8. (union) $A_0 = A_1 \cup A_2 \cup \ldots \cup A_k$ is equivalent to $A_0' = A_0' \cap A_2' \cap \ldots \cap A_k'$. Therefore, only the case $k=2$ will be considered. This is equivalent to Case 6 above.

9. (proper subset) Let $A$, $B \in \epsilon$. $A \subset B$ if and only if $A \subseteq B$ and $|A|<|B|$.
   Observe that:
   constraints of the form $A \subseteq B \cup C$ and of the form $A \cap B \subseteq C$, if not derivable from other constraints, may cause $\tilde{m}$ to be ill-defined;
   constraints of the form $B \cup C \subseteq A$ can be characterized using only subset relations; and
   constraints of the form $C \subseteq A \cap B$ can be characterized using only subset relations.

The above discussions show how various constraints or relations can be transformed into constraints or relations of the form $A \cap B = \emptyset$ and/or $A \subseteq B$, where $A$, $B \in \epsilon$.

Section 11. Graph Representations

FIG. 11 is a flow diagram for generating graph representations, according to an embodiment of the present invention. Actually FIG. 11 presents 2 graphs representations which are used in subsequent discussions—admissibility and compatibility. Both representations are described in this Section. In the previous section, we showed that constraints or relations that can be transformed into constraints or relations of the form $A \cap B = \emptyset$ and/or $A \subseteq B$, where $A$, $B \in \epsilon$ are, for example, necessary for the extension to be well-defined. In this section, we shall show that these conditions might not be sufficient. In order to get a better understanding of the structures of collections of constraints, we shall also represent collections of constraints using graphs.

Let $\epsilon \triangleleft 2^U$. An acceptable constraint or relation for $\epsilon$ is a constraint or relation of the form $A \cap B = \emptyset$ or of the form $A \subseteq B$, where $A$, $B \in \epsilon$. Moreover, let $\mathcal{C}$ be a collection of constraints for $\epsilon \subseteq 2^U$. $\mathcal{C}$ is weakly acceptable if and only if every constraint in $\mathcal{C}$ is acceptable.

Clearly, $\triangleleft$ is transitive. Moreover, if $A \subseteq B$ and $B \cap C = \emptyset$, then $A \cap C = \emptyset$. Therefore, there might be constraints or relations not in $\mathcal{C}$ but implied by the constraints or relations in $\mathcal{C}$.

Let $\mathcal{C}$ be a collection of constraints for $\epsilon \triangleleft 2^U$. $\mathcal{C}$ is maximal if and only if all acceptable constraints implied by $\mathcal{C}$ are also in $\mathcal{C}$. Moreover, $\mathcal{C}_X$ will denote the smallest weakly acceptable collection of constraints that contains $\mathcal{C}$ and is maximal.

Algorithm 1. (Construction of $\mathcal{C}_X$) Let $\mathcal{C}$ be a weakly acceptable collection of constraints for $\epsilon \triangleleft 2^U$.
1. Let $\mathcal{C}_X = \mathcal{C}$.
2. Let $\mathcal{R}_0$ be the subset of $\mathcal{C}$ which contains all the subset relations of $\mathcal{C}$, i.e., $(A \subseteq B) \in \mathcal{R}_0$ if and only if $(A \subseteq B) \in \mathcal{C}$.
3. Construct the transitive closure of $\mathcal{R}_0$ using any standard method, for example, Alfred V. Aho, John E. Hopcroft, and Jeffrey D. Ullman. *The Design and Analysis of Computer Algorithms*. Addison Wesley, 1974.
4. Enlarge $\mathcal{C}_X$ to include all members in the transitive closure of $\mathcal{R}_0$.
5. For each $(A \subseteq B) \in \mathcal{C}_X$, let $\mathcal{R}_{A \subseteq B}$ be the set of all relations of the form $(B \cap C = \emptyset) \in \mathcal{C}_X$. For each relation $(B \cap C = \emptyset) \in \mathcal{R}_{A \subseteq B}$, add to $\mathcal{C}_X$ the relation $(A \cap C = \emptyset)$.

Let $\mathcal{C}$ be a weakly acceptable collection of constraints for $\epsilon \triangleleft 2^U$.
1. The directed graph associated with $(\epsilon, \mathcal{C})$, denoted by $\mathcal{G}_\epsilon(\mathcal{C})$, is the directed graph $(\epsilon, \mathcal{R})$, where $\mathcal{R} = \{(A, B) | A, B \in \epsilon$, either $(A \cap B = \emptyset)$ or $(A \subseteq B) \in \mathcal{C}\}$.
2. The SR-graph associated with $(\epsilon, \mathcal{C})$ is the directed graph $\mathcal{G} = (\epsilon, \mathcal{R})$ where $\mathcal{R} = \{(A, B) | A, B \in \epsilon, (A \subseteq B) \in \mathcal{C}\}$.

Let $\mathcal{C}$ be a weakly acceptable collection of constraints for $\epsilon \triangleleft 2^U$, and let $\mathcal{G}$ be the SR-graph associated with $(\epsilon, \mathcal{C})$. Clearly, every directed cycle in $\mathcal{G}$ is equivalent to some $B_1 \subseteq B_2 \subseteq \ldots \subseteq B_k$, where $B_1 = B_k$, and vice-versa. This implies that $B_1 = B_2 = \ldots = B_k$. Due to the above observation, the following algorithm can be used to remove one or more of (e.g., all) equality relations and one or more of (e.g., all) subset relations in C that give rise to equality:

Algorithm 2. (Removal of Equality Relations) Let $\mathcal{C}$ be a weakly acceptable collection of constraints for $\epsilon \triangleleft 2^U$, and $\mathcal{G}$ be the SR-graph associated with $(\epsilon, \mathcal{C})$.
1. Remove both $A \subseteq B$ and $B \subseteq A$ if both are in $\mathcal{C}$.
2. Determine all directed cycles in $\mathcal{G}$ (this can be done using standard algorithms, for example, depth-first search algorithm discussed in Alfred V. Aho, John E. Hoperoft, and Jeffrey D. Ullman. *The Design and Analysis of Computer Algorithms*. Addison Wesley, 1974).
3. Remove all the subset relations from $\mathcal{C}$ which appear in the directed cycles.
4. Process the equality relations obtained in the Steps 1, and/or 2 using the methods given above on how to handle equality.

Given a weakly acceptable collection of constraints $\mathcal{C}$ for $\epsilon \triangleleft 2^U$. $\mathcal{C}$ is acceptable if and only if $\mathcal{C}$ is maximal, $\emptyset \notin \epsilon$, and no equality relation between any two members of $\epsilon$ can be derived from the constraints in $\mathcal{C}$.

Let $\mathcal{G}$ be an undirected graph and let C be a cycle in $\mathcal{G}$. C is pure if and only if C is simple, has length >3, and contains no subcycles. If $\mathcal{G}$ is a directed graph and C an undirected cycle in $\mathcal{G}$, then C is a pure cycle of $\mathcal{G}$ if and only if C is a pure cycle of $|\mathcal{G}|$.

Let $\mathcal{C}$ be an acceptable collection of constraints for $\epsilon \triangleleft 2^U$. If there exists a pure cycle in $|\mathcal{G}_\epsilon(\mathcal{C})|$, then the extension of m is not well-defined (it is not dependent solely on the individual probabilities).

Section 12. Admissibility

FIG. 12 is a flow diagram for checking for admissibility, according to an embodiment of the present invention. We have shown in the previous section that for m to have a well-defined extension, not only is it necessary that the collection $\mathcal{C}$ of constraints be acceptable, but also that the undirected graph that represents $\mathcal{C}$ cannot have any pure cycle. The main result of this section asserts that this is not only a necessary condition, but it is also a sufficient condition.

Let $\mathcal{G}$ be a directed or undirected graph. $\mathcal{G}$ is admissible if and only if $\mathcal{G}$ has no pure cycles. Moreover, let $\mathcal{C}$ be an acceptable collection of constraints for $\epsilon \triangleleft 2^U$. $\mathcal{C}$ is admissible if and only if $\mathcal{G}_\epsilon(\mathcal{C})$ is admissible.

Clearly, if $\mathcal{C}$ is empty, then $\mathcal{C}$ is admissible. $\mathcal{C}$ is empty means the elements in $\epsilon$ are not subject to any explicit constraints.

Let $\mathcal{G}=(V, \mathcal{R})$ be an undirected graph and $\prec$ a total ordering on V. $\prec$ is permissible on $\mathcal{G}$ if and only if for every A, B, C$\in$V, if $\{A, B\}, \{A, C\}\in \mathcal{R}$ and $\{B, C\}\notin \mathcal{R}$, then either A$\prec$B or A$\prec$C. Let $\mathcal{T}=(V, \mathcal{R})$ be a tree with root T.

Let A$\in$V. d$\mathcal{T}$(A), the depth of A over $\mathcal{T}$, is the length of the path from T to A. In particular, $d(\tau)$=0.

Let A$\in$V. C$\mathcal{T}$(A) is the set of all children of A in $\mathcal{T}$.

$\prec_\mathcal{T}$ is the total ordering on V, where for all A, B$\in$V, A$\prec_\mathcal{T}$B if and only if either d(A)<d(B), or d(A)=d(B) and A lies to the left of B.

Let A$\in$V. L$\mathcal{T}$(A) is the set of all B$\in$V where B=A; d(A)=d (B) and A$\prec_\mathcal{T}$B; or B is the child of some E in $\mathcal{T}$ where d(E)=d(A) and E$\prec_\mathcal{T}$A.

Let $\mathcal{F}=(V, \mathcal{R})$ be a forest, i.e., a collection of disjoint trees, and $\prec$ a total ordering on V. $\prec$ is compatible with $\mathcal{F}$ if and only if for every A, B$\in$V, A$\prec$B whenever A$\prec_\mathcal{T}$B for some tree $\mathcal{T}$ contained in $\mathcal{F}$.

Let $\mathcal{G}=(V, \mathcal{R})$ and $\mathcal{G}_0=(V_0, \mathcal{R}_0)$ be directed or undirected graphs. $\mathcal{G}_0$ is a maximal directed or undirected subgraph of $\mathcal{G}$ if and only if $V_0 \subseteq V$, and for every A, B$\in V_0$, $\{A, B\} \in \mathcal{R}_0$ if and only if $\{A, B\}\in \mathcal{R}$.

Let $\mathcal{G}=(V, \mathcal{R})$ be an undirected graph and $\prec$ a total ordering on V. The following algorithm provides a constructive definition for the concept of recursive breadth-first search (RBFS) forest for $\mathcal{G}$ based on $\prec$. An RBFS forest can be constructed recursively using recursive breadth-first search. In the following algorithm, the nodes in V are initially unmarked, and marking of nodes is a global operation.

Algorithm 1. (Construction of RBFS Forest) Given an undirected graph $\mathcal{G}=(V, \mathcal{R})$ where $V\neq\emptyset$, and $\prec$ a total ordering on V.
1. Let Q be a queue which is initially empty.
2. Let $\mathcal{F}$ be a forest which is initially empty.
3. While there are unmarked nodes in V, do the following:
   a) Let T be the unmarked node in V that precedes all other unmarked nodes in V under $\prec$.
   b) Mark T, and enqueue T into Q.
   c) Add to $\mathcal{F}$ the tree $\mathcal{T}$ which includes the node T (The root of $\mathcal{T}$ is T).
   d) Add to $\mathcal{F}$ the tree $\mathcal{T}$ which includes the node T (The root of $\mathcal{T}$ is T).
      i. Dequeue from Q and let E be the node dequeued.
      ii. Let S be the set consisting of all unmarked nodes in V which are neighbor of E in $\mathcal{G}$.
      iii. If S is not empty, do the following:
         A. Let $\mathcal{G}_0=(S, \mathcal{R}_0)$ be a maximal undirected subgraph of $\mathcal{G}$.
         B. Call Algorithm 1 with input $\mathcal{G}_0$ and let $\mathcal{F}_0$ be the output from the algorithm.
         C. Let $\prec_S$ be a total ordering on S compatible with $\mathcal{F}_0$ and order S according to $\prec_S$.
         D. Make the nodes in S children of E and arranged the children in the prescribed order, i.e., according to $\prec_S$.
         E. Append S to Q in the prescribed order, i.e., according to $\prec_S$.
4. Output $\mathcal{F}$.

Let $\mathcal{G}=(V, \mathcal{R})$ be an undirected graph and let $\prec$ be a total ordering on V. Let $\prec_0$ be a total ordering on V. $\prec$ is an RBFS-ordering on $\mathcal{G}$ based on $\prec_0$ if and only if $\prec$ is compatible with the RBFS forest for $\mathcal{G}$ based on $\prec_0$. Moreover, $\prec$ is an RBFS-ordering on $\mathcal{G}$ if and only if there exists a total ordering $\prec_0$ on V such that $\prec$ is an RBFS-ordering on $\mathcal{G}$ based on $\prec_0$.

Let $\mathcal{C}$ be an acceptable collection of constraints for $\epsilon \triangleleft 2^U$. The following statements are equivalent:
1. $\mathcal{C}$ is admissible.
2. $|\mathcal{G}_\epsilon(\mathcal{C})|$ is admissible.
3. $|\mathcal{G}_\epsilon(\mathcal{C})|$ contains no pure cycle.
4. There exists a total ordering on $\epsilon$ which is permissible on $|\mathcal{G}_\epsilon(\mathcal{C})|$.
5. Any RBFS-ordering on $|\mathcal{G}_\epsilon(\mathcal{C})|$ is permissible on $|\mathcal{G}_\epsilon(\mathcal{C})|$.

Any of the criteria above can be used to test and ensure that $\mathcal{C}$ is admissible.

We shall now provide a polynomial algorithm to determine whether or not a given acceptable collection of constraints for $\epsilon \triangleleft 2^U$ is admissible, based on 5 above. It is clear that RBFS forest and RBFS-ordering can play a central role in the following algorithm.

Algorithm 2. (Checking for Admissibility) Let $\mathcal{C}$ be an acceptable collection of constraints for $\epsilon \triangleleft 2^U$.
1. Construct $\mathcal{G}=|\mathcal{G}_\epsilon(\mathcal{C})|$.
2. Let $\prec_0$ be any total ordering on $\epsilon$. Construct the RBFS-ordering $\prec$ over $\mathcal{G}$ based on $\prec_0$ using Algorithm 1.
3. For i=1 to i=|E|, do the following:
   a) Determine $\Gamma_{\mathcal{G},\prec}(E_i)$.
   b) For every A, B$\in \Gamma_{\mathcal{G},\prec}(E_i)$, determine whether or not $\{A, B\}$ is in $\mathcal{C}$. If $\{A, B\}$ is not in $\mathcal{C}$, stop. $\mathcal{C}$ is not admissible. Otherwise, continue.
4. Stop. $\mathcal{C}$ is admissible.

Section 13. Compatibility

FIG. 13 is a flow diagram of checking for compatibility, according to an embodiment of the present invention. Sufficient conditions for m and $\mathcal{C}$ to be compatible are given in this section. An optimal method for adjusting the values of a given measure to make it compatible with the constraints is also provided.

Let C be an acceptable collection of constraints for $\epsilon \triangleleft 2^U$ and $B \subseteq \epsilon$. B is well-nested under C if and only if for every A, B$\in$B, $r_C(A, B)$ is defined, i.e., any pair of sets in 8 are either disjoint or one of the set is a subset of the other. In addition, if 8 be well-nested under C and T=(V, R) is a tree, then T is a well-nested tree of 8 if and only if V=B$\cup\{U\}$, and for every A, B$\in$V, A is the parent of B in T if and only if A$\supseteq$B.

Let $\mathcal{C}$ be an admissible collection of constraints for $\epsilon \triangleleft 2^U$, $\mathcal{G}=|\mathcal{G}_\epsilon(\mathcal{C})|$, $\prec$ a RBFS-ordering over $\mathcal{G}$ based on some total ordering on $\epsilon$, and $1 \leq |\epsilon|$. The following algorithm provides constructive definitions for $\omega_{p,\mathcal{G},\prec}^k$, $\Omega_{c,\mathcal{G},\prec}^k$ and $\Omega_{s,\mathcal{G},\prec}^k$.

Algorithm 1. (Construction of $\omega_{p,\mathcal{G},\prec}^k$, $\Omega_{c,\mathcal{G},\prec}^k$ and $\Omega_{s,\mathcal{G},\prec}^k$) Let $\mathcal{C}$ be an admissible collection of constraints for $\epsilon \triangleleft 2^U$ and $\prec_0$ a total ordering on $\epsilon$.
1. Construct $\mathcal{G}=|\mathcal{G}_\epsilon(\mathcal{C})|$.
2. Construct the RBFS-ordering $\prec$ over $\mathcal{G}$ based on $\prec_0$ using Algorithm 1.
3. Order the nodes in $\mathcal{G}$ according to $\prec$. Say $E_1, E_2, \ldots E_m$.
4. For k=1 to k=m, do the following:
   (a) Determine $\Gamma_{\mathcal{G},\prec}(E_k)$.
   (b) Construct a well-nested tree $\mathcal{T}_k$ for $\Gamma_{\mathcal{G},\prec}(E_k)$.
   (c) Let $\omega_{p,\mathcal{G},\prec}^k$ be the parent of $E_k$ in $\mathcal{T}_k$.
   (d) Let $\Omega_{s,\mathcal{G},\prec}^k$ be the collection consisting of all siblings of $E_k$ in $\mathcal{T}_k$.
   (e) Let $\Omega_{c,\mathcal{G},\prec}^k$ be the collection consisting of all children of $E_k$ in $\mathcal{T}_k$.
5. Return the following sequences:
   (a) $\omega_{p,\mathcal{G},\prec}^1, \omega_{p,\mathcal{G},\prec}^2, \ldots \omega_{p,\mathcal{G},\prec}^m$
   (b) $\Omega_{s,\mathcal{G},\prec}^1, \Omega_{s,\mathcal{G},\prec}^2, \ldots \Omega_{s,\mathcal{G},\prec}^m$
   (c) $\Omega_{c,\mathcal{G},\prec}^1, \Omega_{c,\mathcal{G},\prec}^2, \ldots \Omega_{c,\mathcal{G},\prec}^m$ Let $\mathcal{C}$ be an admissible collection of constraints for $\epsilon \triangleleft 2^U$, where $\epsilon$ is ordered by a RBFS-ordering $\prec$ over $\mathcal{G}$ based on some total ordering on $\epsilon$, m a measure over $\epsilon$, and $1 \leq k \leq |\epsilon|$.

$$m_{p,\mathcal{G},\prec}^k = m(\omega_{p,\mathcal{G},\prec}^k)$$

$$m_{s,\mathcal{G},\prec}^k = \sum_{E \in \Omega_{s,\mathcal{G},\prec}^k} m(E)$$

$$m_{c,\mathcal{G},\prec}^k = \sum_{E \in \Omega_{c,\mathcal{G},\prec}^k} m(E)$$

Let $\mathcal{C}$ be an admissible collection of constraints for $\epsilon \triangleleft 2^U$, and m a measure over $\epsilon$. m is super additive over $\mathcal{C}$ if and only if $m(E) \geq \Sigma_{E_0 \in \epsilon_0} m(E_0)$ for every $E \in \epsilon$ and $E_0 \subseteq \epsilon$, where all members of $\epsilon_0$ are pairwise disjoint and $E_0 \subseteq E$ for every $E_0 \in \epsilon_0$.

As shown in the following theorem, there are more than one method to test for admissibility—super additivity, permissible total ordering, etc.

Let $\mathcal{C}$ be an admissible collection of constraints for $\epsilon \triangleleft 2^U$ and let m be a measure over $\epsilon$. The following statements are equivalent:
1. m and $\mathcal{C}$ are compatible.
2. m is super additive over $\mathcal{C}$.
3. There exists a total ordering $\prec$ on $\epsilon$ which is permissible on $\mathcal{G}=|\mathcal{G}_\epsilon(\mathcal{C})|$, such that for all $1 \leq i \leq m$, $m_{c,\mathcal{G},\prec}^i \leq m(E_i) \leq m_{p,\mathcal{G},\prec}^i - m_{s,\mathcal{G},\prec}^i$, where $\epsilon = \{E_1, E_2, \ldots, E_m\}$ is ordered according to $\prec$.
4. For all total ordering $\prec$ on $\epsilon$ which is permissible on $\mathcal{G}=|\mathcal{G}_\epsilon(\mathcal{C})|$, and for all $1 \leq i \leq m$, $m_{c,\mathcal{G},\prec}^i \leq m(E_i) \leq m_{p,\mathcal{G},\prec}^i - m_{s,\mathcal{G},\prec}^i$, where $\tau = \{E_1, E_2, \ldots, E_m\}$ is ordered according to $\prec$.

Criteria 2, 3 or 4 above together with Algorithm 1 can be used to test and ensure that m and $\mathcal{C}$ are compatible.

Let $\mathcal{C}$ be a collection of constraints for $\epsilon \triangleleft 2^U$, and let $\epsilon_0 \subseteq \epsilon$, $E_0 \in \epsilon \cup \{U\}$. $\epsilon_0$ is a disjoint group of $\epsilon_0$ under $\mathcal{C}$ if and only if $E \subseteq E_0$ for every $E \in \epsilon_0$, and all the members of $\epsilon_0$ are pairwise disjoint under $\mathcal{C}$. Moreover, $\epsilon_0$ is a maximal disjoint group of $E_0$ under $\mathcal{C}$ if and only if $\epsilon_0$ is a disjoint group of $E_0$ under $\mathcal{C}$, and for every $\epsilon_1 \subseteq \epsilon$ where $\epsilon_1 \supset \epsilon_0$, $\epsilon_1$ is a NOT a disjoint group of E under $\mathcal{C}$.

FIG. 14 is a flow diagram of guaranteeing compatibility, according to an embodiment of the present invention.

Problem 1. (Minimization Problem for Compatibility) Let $\mathcal{C}$ be a collection of constraints for $\epsilon \triangleleft 2^U$, and m a measure over $\epsilon$.
1. For each $E \in \epsilon \cup \{U\}$, let $x_E$ be a real variable where $0 \leq x_E \leq m(E)$.
2. For each $E_0 \subseteq \epsilon$ and $E_0 \in \epsilon$ where $\epsilon_0$ is a maximal disjoint group of $E_0$ under $\mathcal{C}$, introduce the linear constraint $\Sigma_{E \in \epsilon_0} x_E \leq x_{E_0}$.
3. Minimize the objective function $\Sigma_{E \in \epsilon}(m(E) - x_E)^2$, Problem 1 is a quadratic programming problem (Alexander Schrijver. *Theory of Linear and Integer Programming*. John Wiley, 1998) and therefore can be solved using standard techniques.

Let $\mathcal{C}$ be a collection of constraints for $\epsilon \triangleleft 2^U$, and m a measure over $\epsilon$. Let $x_E$ be a solution of Problem 1, and let $m_0(E) = x_E$ for every $E \in \epsilon$. Then $m_0$ is the measure over $\epsilon$ induced by m.

The above definition can be extended to partial measures. A partial measure m over $\epsilon$ is a measure over some subset of $\epsilon$. In this case, we extend m such that m(E)=1 for all $E \in \epsilon$ which are not in the domain of m.

There are many other ways to guarantee that $\mathcal{C}$ and m are compatible, besides solving Problem 1. Nevertheless, the measure $m_0$ above is the measure closest to m, in the least square sense, without exceeding it. It should be noted that adjustment of the values of any measure might need to be done only sparingly to ensure the integrity of $\mathcal{C}$ and m.

Section 14. Preprocessing and Extension

FIG. 15 is a flow diagram of preprocessing, according to an embodiment of the present invention. In order to make the computation of $\tilde{m}(E)$, where $E \in \epsilon$, more efficient, an algorithm for preprocessing $\epsilon$, $\mathcal{C}$ and m is given. The preprocessing algorithm also determines whether or not $\mathcal{C}$ is admissible, and whether or not m and $\mathcal{C}$ are compatible.

Algorithm 1. (Preprocess $\epsilon$, $\mathcal{C}$ and m) Let $\mathcal{C}$ be an acceptable collection of constraints for $\epsilon \triangleleft 2^U$, $\prec_0$ a total ordering on $\epsilon$, and m a measure over $\epsilon$.
1. Construct $\mathcal{G}=|\mathcal{G}_\epsilon(\mathcal{C})|$.
2. Construct the RBFS-ordering $\prec$ over $\mathcal{G}$ based on $\prec_0$ using Algorithm 1.
3. Order the nodes in $\mathcal{G}$ according to $\prec$. Say $E_1, E_2, \ldots E_m$.
4. For k=1 to k=m, do the following:
   a) Determine $\Gamma_{\mathcal{G},\prec}(E_k)$.
   b) For every A, $B \in \Gamma_{\mathcal{G},\prec}(E_k)$, determine whether or not $\{A, B\}$ is in $\mathcal{C}$. If $\{A, B\}$ is not in $\mathcal{C}$, stop. $\mathcal{C}$ is not admissible. Otherwise, continue.
   c) Construct a well-nested tree $\mathcal{T}_k$ for $\Gamma_{\mathcal{G},\prec}(E_k)$.
   d) Determine $m_{p,\mathcal{G},\prec}^k$, $m_{s,\mathcal{G},\prec}^k$, and $m_{c,\mathcal{G},\prec}^k$. (see Algorithm 1)
   e) Test whether or not the conditions for compatibility are satisfied. If any of the conditions are violated, stop. $\mathcal{C}$ is not compatible with m. Otherwise, continue.
   f) Let $m_{\mathcal{G},\prec}(E_k) = [m(E_k) - m_{c,\mathcal{G},\prec}^k] \div [m_{p,\mathcal{G},\prec}^k - m_{s,\mathcal{G},\prec}^k - m_{c,\mathcal{G},\prec}^k]$.
5. Return $m_{\mathcal{G},\prec}$.

The preprocessing of $\epsilon$, $\mathcal{C}$ and m, combines all the constraints in $\mathcal{C}$ and produces a new function $m_{\mathcal{G},\prec}$. Clearly, $m_{\mathcal{G},\prec}$ is a measure over $\epsilon$.

Let $\mathcal{C}$ be an admissible collection of constraints for $\epsilon=\{E_1, E_2, \ldots, E_m\} \triangleleft 2^U$, where $\epsilon$ is ordered by some total ordering $\prec$ on $\epsilon$ which is permissible on $|IG_\epsilon(\mathcal{C})|$. If $E \epsilon \epsilon$, then define $m_{\mathcal{G},\prec}(E') = 1 - m_{\mathcal{G},\prec}(E)$.

Let $\mathcal{B} \triangleleft 2^U$. $\overline{\mathcal{B}} = \mathcal{B} \cup \{B' | B \epsilon \mathcal{B}\}$. Moreover, let $\epsilon \triangleleft 2^U$. $\mathcal{B}$ is coset of $\epsilon$ if and only if $\mathcal{B} \subseteq \epsilon$ and for every $E \epsilon \epsilon$, not both $E$ and $E'$ are in $\mathcal{B}$.

Let $\mathcal{C}$ be an admissible collection of constraints for $\epsilon=\{E_1, E_2, \ldots, E_m\} \triangleleft 2^U$, where $\epsilon$ is ordered by some total ordering $\prec$ on $\epsilon$ which is permissible on $|G_\epsilon(\mathcal{C})|$, and $\mathcal{B}$ a coset of $\epsilon$. The $\prec$-cover $\Lambda(\Lambda_{\mathcal{G},\prec})$ of $\mathcal{B}$ under $\mathcal{G}$ is the smallest coset of $\epsilon$ satisfying the following conditions:

1. $\mathcal{B} \subseteq \mathcal{B}(\mathcal{B})$;

2. If $B = E_k$ and there exists $B_0 \epsilon \Lambda_{\mathcal{G},\prec}(\mathcal{B})$ where $B$ is the parent of $B_0$ with respect to the well-nested tree $\mathcal{T}_k$ for $\Gamma_{\mathcal{G},\prec}(E_k)$, then $B \epsilon \Lambda_{\mathcal{G},\prec}(\mathcal{B})$; and 3. If $B = E_k$ and there exists $B_0 \epsilon \Lambda_{\mathcal{G},\prec}(\mathcal{B})$ where $B$ is a sibling of $B_0$ with respect to the well-nested tree $\mathcal{T}_k$ for $\Gamma_{\mathcal{G},\prec}(E_k)$, then $B' \epsilon \Lambda_{\mathcal{G},\prec}(\mathcal{B})$.

Let $\mathcal{C}$ be an admissible collection of constraints for $\epsilon=\{E_1, E_2, \ldots, E_m\} \triangleleft 2^U$, where $\epsilon$ is ordered by some total ordering $\prec$ on $\epsilon$ which is permissible on $|IG_\epsilon(\mathcal{C})|$, $m$ a measure over $\epsilon$ which is compatible with $\mathcal{C}$, and $\mathcal{B}$ a coset of $\epsilon$. Let $I(\mathcal{B})$ be the intersection of all the sets in $\mathcal{B}$. If $I(\mathcal{B}) \neq \emptyset$, then for every permissible total ordering $\prec$ on $\epsilon$:

$$\tilde{m}(I(B)) = \tilde{m}\left(\bigcap_{B \in \Lambda_{\mathcal{G},\prec}(B)}(B)\right) = \prod_{B \in \Lambda_{\mathcal{G},\prec}(B)} m_{\mathcal{G},\prec}(B).$$

In particular, if $\mathcal{C} = \emptyset$, then $$\tilde{m}(I(B)) = \tilde{m}\left(\bigcap_{B \in B}(B)\right) = \prod_{B \in B} m_{\mathcal{G},\prec}(B).$$

The above result provides a method for determining $\tilde{m}(I(\mathcal{B}))$. Clearly, under $m_{\mathcal{G},\prec}$, the relevant sets in $\epsilon$ are basically stochastically independent. This is the reason why we named our method constraint stochastic independence method. Furthermore, $\tilde{m}(I(\mathcal{B}))$ can be determined in $O(|\mathcal{B}|^2)$-time after preprocessing.

In general, if $G \epsilon \epsilon$, we can express $G$ as union of intersections of sets, such as disjunctive normal form. If all the terms in the expression are pair-wise disjoint, $\tilde{m}(G)$ can be determined by applying the above result to each term and then summing them.

Section 15. Unification Algorithms

In this section, we provide several algorithms for determining $\sigma_\kappa(F)$.

Let $\mathcal{P}$ be a collection of propositions.

$\acute{\mathcal{P}} = \{P' | P \epsilon \mathcal{P}\}$ and $\bar{\mathcal{P}} = \mathcal{P} \cup \acute{\mathcal{P}}$.

$\breve{\mathcal{P}}$ is the collection of all $V_{P \epsilon} \mathcal{Q}$ where $\mathcal{Q} \subseteq \bar{\mathcal{P}}$. For completeness, $V_{P \epsilon} \mathcal{Q} P = F$ if $\mathcal{Q} = \emptyset$.

$\tilde{\mathcal{P}}$ is the smallest collection of propositions containing $\mathcal{P}$ and close under negation, conjunction and disjunction.

Let $\mathcal{P}$ be a collection of atomic propositions. $\mathcal{Q}$ is a coset of $\mathcal{P}$ if and only if $\mathcal{Q} \subseteq \bar{\mathcal{P}}$, and for every $P \epsilon \mathcal{P}$, not both $P$ and $P'$ are in $\mathcal{Q}$. Let $L \epsilon \breve{\mathcal{P}}$. $L$ is d-simple if and only if $L = V_{P \epsilon} \mathcal{Q} P$ for some coset $\mathcal{Q}$ of $\mathcal{P}$.

Without loss of generality, we shall assume that $L$ is d-simple whenever $L \epsilon \breve{\mathcal{P}}$.

An AKB $\kappa$ is disjunctive if and only if there exists a finite collection $\mathcal{P}_\kappa$ of atomic propositions such that $A \epsilon \breve{\mathcal{P}}_\kappa$ for every $(E \rightarrow A) \epsilon \kappa$.

We shall assume that $\mathcal{P}_\kappa$ is the smallest collection of atomic propositions that satisfies the above definition.

The following show how to transform an arbitrary AKB into a disjunctive AKB.

Algorithm 1. (Disjunctive AKB) Given an AKB $\kappa$.

1. For each $\omega \epsilon \kappa$, do the following:

(a) Express $r(\omega)$ as $L_1 \wedge L_2 \wedge \ldots \wedge L_k$, where $L_i \epsilon \breve{\mathcal{P}}_\kappa$ and $L_i$ is simple for each $i = 1, 2, \ldots, k$.

(b) For each $i = 1, 2, \ldots, k$, add to $\kappa$ the object $l(\omega) \rightarrow L_i$.

(c) Remove $\omega$ from $\kappa$.

2. Return $\kappa$.

Let $\kappa$ be an AKB. $\kappa$ is irreducible if and only if $\kappa$ satisfies the following conditions:

1. For every $\omega \epsilon \kappa$, $l(\omega) \neq \emptyset$ and $r(\omega) \neq T$.
2. $\kappa$ is disjunctive.
3. For every $\omega_1, \omega_2 \epsilon \kappa$, if $r(\omega_1) = r(\omega_2)$, then $l(\omega_1) = l(\omega_2)$.
4. For every $\omega_1, \omega_2 \epsilon \kappa$, if $r(\omega_1) \Rightarrow r(\omega_2)$, then $l(\omega_1) \subseteq l(\omega_2)$.

The following show how to transform an arbitrary AKB into an irreducible AKB. Algorithm 2. (Irreducible AKB) Given an AKB $\kappa$.

1. Remove all $\omega$ from $\kappa$ where $l(\omega) = \emptyset$ or $r(\omega) = T$.
2. Transform $\kappa$ into a equivalent disjunctive AKB using Algorithm 1.
3. Let $\kappa = \{\omega_\kappa^r | \omega \epsilon \kappa\}$, where $\omega_\kappa^r = \vee_{\mu \epsilon \kappa, r(\mu) = r(\omega)} \mu$.
4. For every $\omega \epsilon \kappa$, let $\kappa_\omega = \{\mu \epsilon \kappa | \rho(r(\mu)) \subseteq \rho(r(\omega))\}$.
5. For every $\omega \epsilon \kappa$ such that $|\kappa_\omega| > 1$, replace $\omega$ with $\vee_{\mu \epsilon \kappa_\omega} \mu$.
6. Return $\kappa$.

Let $\kappa$ be an irreducible AKB.

$\overline{\Omega}_\kappa = \{E \rightarrow A | E \subseteq U, A \epsilon \breve{\mathcal{P}}_\kappa\}$, $\breve{\Omega}_\kappa = \{E \rightarrow A | E \subseteq U, A \epsilon \breve{\mathcal{P}}_{i,\kappa}\}$ and $\tilde{\Omega}_\kappa = \{E \rightarrow A | E \subseteq U, A \in \tilde{\mathcal{P}}_\kappa\}$.

Let $\emptyset = \Omega \subseteq \tilde{\Omega}_\kappa$. Then $\wedge_{w \epsilon \Omega} = (U \rightarrow T)$ and $\vee_{w \epsilon \Omega} = (\emptyset \rightarrow F)$.

Let $\omega \epsilon \breve{\Omega}_\kappa$. $\rho(\omega)$ is the collection of all $P \epsilon \breve{\mathcal{P}}_\kappa$ that occur in $r(\omega)$, and $|\omega| = |\rho(\omega)|$. Let $\mathcal{P} \subseteq \breve{\mathcal{P}}_\kappa$. $\omega/\mathcal{P}$ is obtained from $\omega$ by removing from $r(\omega)$ all $P \epsilon \mathcal{P}$. If $\rho(\omega) \subseteq \mathcal{P}$, then $\omega/\mathcal{P} = (l(\omega) \rightarrow F)$. Moreover, if $\mathcal{P} = \{P\}$, then $\omega/P = \omega/\mathcal{P}$.

Let $\lambda \subseteq \kappa$ and $\mathcal{P} \subseteq \breve{\mathcal{P}}_\kappa$.

$\lambda^{\lambda_\mathcal{P}} = \{\mu \epsilon | \mathcal{P} \subseteq \rho(\mu)\}$, $\overline{\lambda}^{\lambda_\mathcal{P}} = \mu \epsilon \lambda | \mathcal{P} \cap \rho(\mu) = \emptyset$, and $\lambda/\mathcal{P} = \{\mu/\mathcal{P} | \mu \epsilon \alpha\}$.

If $\mathcal{P} = \{P\}$, then $\lambda_P = \lambda^{\lambda_\mathcal{P}}$, $\overline{\lambda}_P = \overline{\lambda}^{\lambda_\mathcal{P}}$ and $\lambda/P = \lambda/\mathcal{P}$.

Let $\kappa$ be an irreducible AKB and $P \epsilon \breve{\mathcal{P}}_\kappa$. $P$ is a useless symbol if and only if $\kappa_P = \emptyset$ or $\kappa_{P'} = \emptyset$. Moreover, $\kappa$ is useful if and only if $P$ is not a useless symbol for all $P \epsilon \breve{\mathcal{P}}_\kappa$.

The following show how to transform an irreducible AKB into a useful AKB. Algorithm 3. (Useful AKB) Given a irreducible AKB $\kappa$.

1. While there exists a useless symbol $P \epsilon \breve{\mathcal{P}}_\kappa$, let $\kappa = \overline{\kappa}_{\{P,P'\}}$.
2. Return $\kappa$.

Let $\kappa$ be an irreducible AKB, $\omega_1, \omega_2 \epsilon \breve{\Omega}_\kappa$ and $P \epsilon \breve{\mathcal{P}}_\kappa$. $P$ is complemented with respect to $\omega_1$ and $\omega_2$ if and only if either $P \epsilon \rho(\omega_1)$ and $P' \epsilon \rho(\chi_2)$, or $P' \epsilon \rho(\chi_1)$ and $P \epsilon \rho(\chi_2)$).

Let $\kappa$ be an irreducible AKB and $\omega_1, \omega_2 \epsilon \breve{\Omega}_\kappa$. $c(\omega_1, \omega_2)$ is the collection of all $P \epsilon \breve{\mathcal{P}}_\kappa$ where $P$ is complemented with respect to $\omega_1$ and $\omega_2$.

Let $P \epsilon \breve{\mathcal{P}}_\kappa$.

$\omega_1 \sim^P \omega_2$ if and only if $P \epsilon \rho(\omega_1)$, $P' \epsilon \rho(\omega_2)$ and $c(\omega_1/P, \omega_2/P') = \emptyset$.

$\omega_1 \boldsymbol{18} \omega_2$ if and only if $\omega_1 \sim^P \omega_2$ for some $P \epsilon \breve{\mathcal{P}}_\kappa$. In other words, $\omega_1 \sim \omega_2$ if and only if $|c(\omega_1, \omega_2)| = 1$.

If $\omega_1 \sim^P \omega_2$ where $P \epsilon \breve{\mathcal{P}}_\kappa$, then $\omega_1 \Diamond \omega_2 = (l(\omega_1) \cap l(\omega_2) \rightarrow r(\omega_1/P) \vee r(\omega_2/P'))$. Otherwise, $\omega_1 \Diamond \omega_2$ is not defined. In other words, $\omega_1 \diamond \omega_2$ merges $\omega_1$ and $\omega_2$ and removes both P and P'. In this case, we say that $\omega_1$ and $\omega_2$ are mergeable (300)

$\Gamma(\kappa, \omega) = (\kappa - \{\mu \in \kappa | r(\mu) = r(\omega)\}) \cup \{ \vee_{\mu \in \kappa, r(\mu) = r(\omega)} \mu \}$.

FIG. 4 is a flow diagram of an example unification algorithm, according to an aspect of an embodiment of the invention. FIG. 4 also emphasizes a new unification operator for reasoning under uncertainties and/or incompleteness capable of managing the rules and the sets of evidences together.

Algorithm 4. (Unification Algorithm) Given a irreducible AKB $\kappa$.
 1. Do while there exists an unmarked pair $(\omega_1, \omega_2)$, where $\omega_1, \omega_2 \in \kappa$ and $\omega_1 \sim \omega_2$:
    (a) Let $\kappa = \Gamma(\kappa, \omega_1 \diamond \omega_2)$.
    (b) Mark $(\omega_1, \omega_2)$.
 2. Let $\mathcal{G} = \{G \subseteq U | (G \rightarrow F) \in \kappa\}$. If $\mathcal{G} \neq \emptyset$, then return $\cup_{G \in \mathcal{G}} G$. Otherwise, return $\emptyset$.

Let $\kappa$ be an irreducible AKB and $P \in \bar{\mathcal{P}}_\kappa$. Since $\sigma_\kappa(F) = \sigma_\kappa(P) \cap \sigma_\kappa(P')$, therefore $\sigma_\kappa(F)$ can be determined recursively on $\mathcal{P}_\kappa$. Although this requires the computations of both $\sigma_\kappa(r(\omega))$ and $\sigma_\kappa((r(\omega)'))$, the two can be carried out in an integrated manner. Moreover, it can be used to reduce the size of $\kappa$.

The following show how to construct $\kappa | P$ given an irreducible AKB $\kappa$, and $P \in \bar{\mathcal{P}}_\kappa$.

Algorithm 5. (Construction of $\kappa | P$) Given a irreducible AKB $\kappa$, and $P \in \bar{\mathcal{P}}_\kappa$. Return $\kappa | P$.
 1. Do while there exists an unmarked pair $(\omega_1, \omega_2)$, where $\omega_1 \in \kappa_P$, $\omega_2 \in \kappa_{P'}$, and $\omega_1 \sim^P \omega_2$
    (a) Let $\kappa = \Gamma(\kappa, \omega_1 \diamond \omega_2)$.
    (b) Mark $(\omega_1, \omega_2)$.
 2. Return $\hat{\kappa}_{\{P,P'\}}$.

Algorithm 5 can be used as a basis for a unification algorithm as shown below:

Algorithm 6. (Unification Algorithm based on $\kappa | P$) Given a irreducible AKB $\kappa$. Return $G \subseteq U$.
 1. While there exists $P \in \mathcal{P}_\kappa$, apply Algorithm 5 with input $\kappa$ and P, and let $\kappa = \kappa | P$.
 2. Let $\mathcal{G} = \{G \subseteq U | (G \rightarrow F) \in \kappa\}$. If $\mathcal{G} \neq \emptyset$, then return $\cup_{G \in \mathcal{G}} G$. Otherwise, return $\emptyset$.

By virtue of the above results, $\omega_1 \diamond \omega_2$, where $\omega_1 \sim \omega_2$, can be used as the basic operation in any unification algorithm for determining $\sigma_\kappa(F)$. (See FIG. 4) The operator $\diamond$ is capable of performing deduction under uncertainties and/or incompleteness and is therefore a significant and natural generalization of the classical deduction process. Step 5 of Algorithms 4 and 6 can be intentionally left vague so that any ordering of $(\omega_1, \omega_2)$, where $\omega_1, \omega_2 \in \kappa$ and $\omega_1 \sim \omega_2$, and any ordering of $\mathcal{P}_\kappa$, can be used. As a matter of fact, many heuristics can be applied to various unification algorithms, e.g., Algorithms 4 and 6, to make them more efficient.

If necessary, the algorithms below can be used to reduce the size of $\kappa$, and therefore can be used to devise approximate algorithms to determine $\sigma_\kappa(L)$.

Algorithm 7. (Processing Rules with length$\leq$q) Given a irreducible AKB $\kappa$ and a non-negative integer q. Return $\kappa^{(q)}$.
 1. Apply Algorithm 3 to transform $\kappa$ into an equivalent useful AKB.
 2. While there exists an unmarked pair $(\omega_0, \omega_1)$ where $\omega_0, \omega_1 \in \kappa$ such that $|\omega_0| \leq q$ and $\omega_0 \sim \omega_1$, do the following:
    (a) Let $\kappa = \Gamma(\kappa, \omega_0 \diamond \omega_1)$.
    (b) Mark the pair $(\omega_0, \omega_1)$.
 3 Return $\kappa$.

Let $\kappa$ be an irreducible AKB, $\omega_1, \omega_2 \in \kappa$, and $\omega_1 \sim \omega_2$. $d(\omega_1, \omega_2) = |\omega_1 \diamond \omega_2| - \max(|\omega_1|, |\omega_2|)$.

Algorithm 8. (Processing Rules with $d(\omega_1, \omega_2) \leq q$) Given a irreducible AKB $\kappa$ and integer $q \geq -1$. Return $\kappa^{[q]}$.

1. Apply Algorithm 3 to transform $\kappa$ into an equivalent useful AKB.
 2. While there exists an unmarked pair $(\omega_1, \omega_2)$ where $\omega_1, \omega_2 \in \kappa$ such that $d(\omega_1, \omega_2) \leq q$, do the following:
    (a) If $\omega_1 \sim \omega_2$, replace $\kappa$ by $\Gamma(\kappa, \omega_1 \diamond \omega_2)$.
    (b) Mark the pair $(\omega_1, \omega_2)$.
 3. Return $\kappa$.

The embodiments of the present invention can provide one or more of the following:

A computer-based method for constructing, reasoning, analyzing and applying knowledge bases with uncertainties and/or incompleteness. The system/model will be referred to as augmented knowledge base (AKB): (See Section 1)
 (a) The objects in an AKB are of the form E→A, where A is a logical sentence in a first-order logic, a proposition or a rule in the traditional sense, and E is a set corresponding to the body of evidences that supports A.
 (b) No restrictions are imposed on E→A. For example, it is possible to have both $E_1$→A and $E_2$→A in the AKB $\kappa$. This means two or more sets of evidences can be used to support the same rule, thereby allowing, among other things, multiple experts/sources to be involved in designing a single AKB.
 (c) Relationships among the bodies of evidences can be specified explicitly. In other words, constraints may be imposed on the bodies of evidences.
 (d) A mapping associates each set (body of evidences), not each rule, with a value.
 (e) In an AKB, evidences (the E's) and rules (the A's) represent completely different objects and each play an essential but separate role in the operations of an AKB.

FIG. 3 provides the basic mechanism for deductive reasoning on an AKB, according to an embodiment of the present invention. The basic mechanism associated with deductive reasoning on an AKB $\kappa$ is $$Gk \xrightarrow{d} {}_k L,$$

where G is a body of evidences and L is a target rule. The support $\sigma_\kappa(L)$ of L with respect to $\kappa$, and the plausibility $\bar{\sigma}_\kappa(L)$ of L with respect to $\kappa$ can all be determined using $$Gk \xrightarrow{d} {}_k L.$$

(See Section 1)

Computation of $\sigma_\kappa(L)$ and $\bar{\sigma}_\kappa(L)$, the support and plausibility of L, where L is a target rule, using $\sigma_\kappa(L) = \sigma_{\kappa_0}(F)$ where $\kappa_0 = \kappa \cup \{U \rightarrow L'\}$; and $\bar{\sigma}_\kappa(L) = \sigma_{\kappa_1}(F)$ where $\kappa_1 = \kappa \cup \{U \rightarrow L\}$. (See Section 1). This provides a universal method for computing the support and plausibility of L, for any L.

A new unification operator $\omega_1 \diamond \omega_2$ which is applicable to knowledge bases with uncertainties and/or incompleteness. (See Unification Algorithms Section). This new unification operator extends and generalizes the classical unification operators. The classical unification operators are not capable of dealing with uncertainties and/or incompleteness. (See also FIG. 4)

Several unification methods/algorithms for determining $\sigma_\kappa(F)$. (See Unification Algorithms Section). FIG. 4 is a flow diagram of an example unification algorithm, according to an aspect of an embodiment of the invention.

Functions or mappings representing the strength or validity of the body of evidences associated with a given rule, as well as, associated with all relevant rules. They are referred to as measure. (See Section 2)

AKBs can use the extension scheme constraint stochastic independence method given above and/or any other extension schemes, like those given in Section 2. Moreover, AKB can select more than one scheme at a time, and applied them either simultaneously and/or conditionally.

Figure 6:
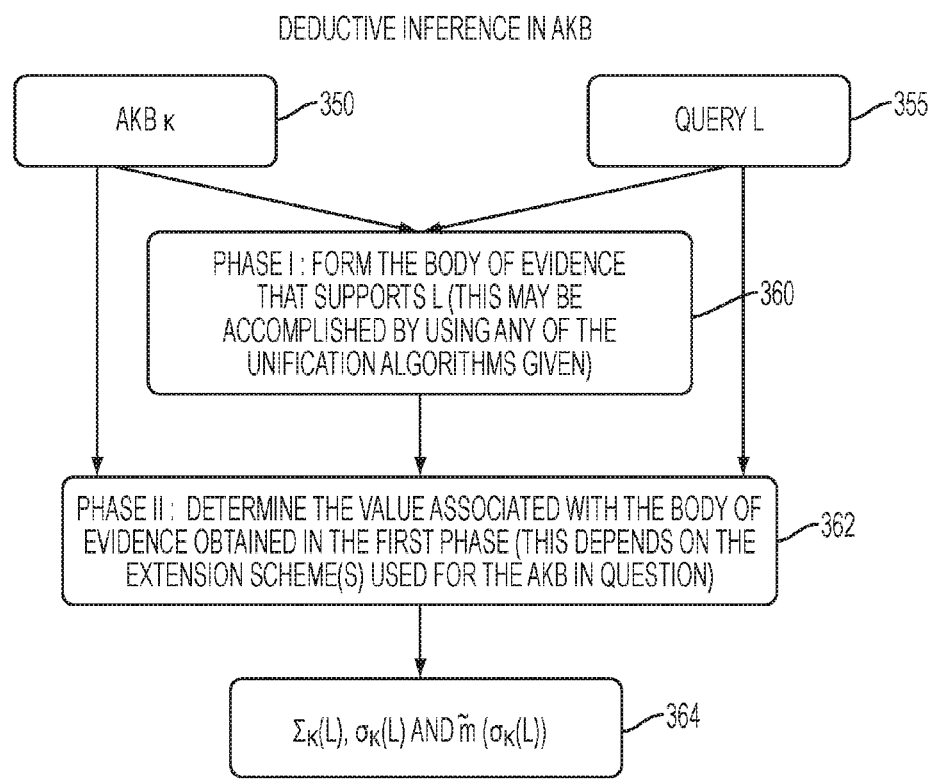
FIG. 6 is a flow diagram of deductive inference in AKB, according to an embodiment of the present invention.

FIG. 6 is a flow diagram of deductive inference in AKB, according to an embodiment of the present invention. Method for performing deductive inference in an AKB—done in two separate steps: Given AKB $\kappa$ (350) and target rule L (355). (See Sections 2 and 4).

(1) Form the body of evidences that supports L. This can be accomplished by applying any of the Unification Algorithms given (360).

(2) Determine the value associated with the body of evidences obtained in the first step. This depends on the extension scheme(s) selected for $\kappa$ (362 and 364).

AKB encompasses most of the well-known formalisms of knowledge bases together with their associated reasoning schemes, including probabilistic logic (N. J. Nilsson. Probabilistic logic. *Artificial Intelligence*, 28:71-87, 1986), Dempster-Shafer theory (G. Shafer. *A Mathematical Theory of Evidence*. Princeton University Press, 1976), Bayesian network (Judea Pearl. *Probabilistic Reasoning in Intelligent Systems: Networks of Plausible Inference*. Morgan Kaufmann, 1988), Bayesian knowledge base (Eugene Santos, Jr. and Eugene S. Santos. A framework for building knowledge-bases under uncertainty. *Journal of Experimental and Theoretical Artificial Intelligence*, 11:265-286, 1999), fuzzy logic (L. A. Zadeh. The role of fuzzy logic in the management of uncertainty in expert systems. Fuzzy Sets and Systems, 11:199-227, 1983; L. A. Zadeh. Fuzzy sets. Information and Control, 8:338-353, 1965. 41; R. Yager. Using approximate reasoning to represent default knowledge. *Artificial Intelligence*, 31:99-112, 1987), numerical ATMS (Johan DeKleer. An assumption-based TMS. Artificial Intelligence, 28:163-196, 1986), incidence calculus (Alan Bundy. Incidence calculus: A mechanism for probabilistic reasoning. *Journal of Automated Reasoning*, 1(3):263-283, 1985; Weiru Liu and Alan Bundy. Constructing probabilistic atmss using extended incidence calculus. *International Journal of Approximate Reasoning*, 15(2):145-182, 1996), etc. We illustrated how to recast the first four as AKBs (see Section 3), so that they can be expanded, and results obtained for AKBs can be applied directly to them.

Present several important properties of AKBs and provide methods for checking, applying and/or managing them. The properties include: consistency, completeness, perfectness, contribution, i-consistency, i-completeness, i-perfectness, monotonicity, contribution, vulnerability, possible deception, etc. (see Section 5 and 6). (Many of these properties, such as contribution, vulnerability, etc. are applicable to any complex systems.)

Methods to enable AKBs to perform inductive inferences and extract meaningful new knowledge from AKBs as long as certain consistency conditions are satisfied (see Section 6). One such method of performing inductive inference in an AKB is as follows: Given AKB $\kappa$ and L$\in\mathcal{L}$.

(a) Construct $\underline{\kappa}$ and L'.
(b) Perform deductive inference on $\underline{\kappa}$ and L'.

Methods to construct consistent higher order AKBs, including $\mathcal{K}_\kappa^0$, $\mathcal{K}_\kappa^1$ and different varieties of $\mathcal{K}_\kappa^2$, to serve as extensions of any inconsistent AKB (see Section 7).

Present a new system/model named free-form database (FFDB) and provide methods for transforming relational databases and deductive databases into FFDBs, i.e., augmented relational database and augmented deductive database, which are special cases of AKBs (see Section 8). This provides a new way of dealing with relational databases and deductive databases, as well as expanding their capabilities.

Using FFDB, new system/model named augmented inductive database is presented which can be used to extract new information from relational databases (see Section 8). This provides a general, as well as integrated method for performing data mining.

A method for extending any probabilistic measure via the new notion of $\epsilon \vartriangleleft 2^U$ and by taking the average of all allowable sets. This method is referred to as constraint stochastic independence (CSI) method (see Sections 9). This method has a clear probabilistic semantics, and therefore not subject to the anomalies that are usually associated with other extension schemes.

Provide a new computational scheme for reasoning under uncertainties and/or incompleteness based on constraint stochastic independence method (see Section 10).

Present allowable constraints and provide methods to transform standard relations among sets into allowable constraints (see Section 10).

Provide a graph representation of weakly acceptable collection of constraints (see Sections 11).

Methods for checking and ensuring that the collection of constraints is admissible (see 12).

Methods for checking and ensuring that the constraints are compatible with the measure in the extension scheme based on CSI (see Section 13).

Optimal method to adjust the values of the measure to guarantee compatibility (see Section 13).

Provide a preprocessing method/algorithm so that the extension based on CSI can be computed more efficiently (see Section 14).

A method of representing/processing/extracting knowledge into/over/from a knowledge-based system, is provided as follows:

(i) A knowledge base containing objects where each object is a rule or logical sentence (knowledge) associated with a set of evidences that supports the knowledge; Existing knowledge base, that involves uncertainties and/or incompleteness, contains mostly rules/knowledge, and a number representing the strength of the rule. Although evidences may be used in determining the number, these evidences are not explicitly represented in the knowledge base nor are they used in any way in the inference scheme.

(ii) A set of relationships among the bodies of evidences; Since existing knowledge bases used numbers directly, rather than bodies of evidences, they are incapable of dealing with the relationships among the bodies of evidences. This is a very significant factor in making the knowledge base, presented in embodiments of this invention, more powerful, robust, accurate and/or capable of more refined characterizations.

(iii) A mapping which associates each body of evidences with a value. In addition, each piece of knowledge may be associated with multiple bodies of evidences. Moreover, same bodies of evidences and/or some combinations of these bodies of evidences may be associated with any knowledge. This allows the knowledge base to be created by multiple experts and/or from multiple sources.

(iv) Methods for performing deductive and inductive inferences. Existing knowledge bases can only perform deductive inferences. However, since inductive inferences, in a knowledge base according to embodiments of this invention, can be viewed as dual (for example, inductive inference can be represented as the dual of inductive inference, i.e., instead of the original knowledge base, the negation of the knowledge and the complement of the associated bodies of evidences are used. Inductive inference can be used to extract new knowledge from the given knowledge base), inductive inferences can also be performed using our knowledge base. Inductive inference can be used to extract new knowledge from the original knowledge base, in other words, it is capable of doing data mining, etc.

According to an embodiment of the present invention, the described functions are implemented as a computer online service providing a database of knowledge according to embodiments of the present invention for representation of knowledge, knowledge acquisition mechanisms and inference mechanisms to output results or reports. According to an embodiment, a target knowledge is expressly associated with a set evidences that supports the target knowledge. The set of evidences can be dynamically maintained, for example, updated. The relationship of evidences with the target knowledge can be based upon input upon acquisition of the target knowledge. According to an embodiment, relationships among evidences (constraints) in a set of evidences are maintained. Target knowledge can be retrieved from data sources and/or created/generated. In addition, the evidences, including its relationships, in support of the target knowledge can be retrieved from data sources and/or created/generated. A computer implemented user interface can be provided to support input of target knowledge, its associated evidences, relationships among the evidences. Semantic data source based upon a domain ontology including value of evidences in support of the knowledge can be utilized.

For example, an expert (person and/or machine) can create knowledge and/or evidences, including its relationships, in support of the knowledge. According to an embodiment, a blog, social media chat or information may be a source of knowledge and/or evidences, including its relationships.

According to an embodiment, inference mechanism (reasoning) is based upon a value indicative of strength of the evidence. Deductive inference involves determining a set of evidences and its validity. Inductive inference involves determining the set of evidences that can induce new knowledge or extract (data mining) new knowledge, by utilizing the constraints of the evidences in the set of evidences supporting the target knowledge. According to the embodiments described methods are provided for checking and ensuring that the constraints are admissible and/or compatible, as described for example in paragraphs 233, 244 and FIGS. 12-13, an optimal method is provided to adjust the values of the measure to guarantee compatibility in case it is not compatible, and a preprocessing method/algorithm is provided so that the extension can be computed more efficiently.

Evidence strength indications may be derived and/or input, for example, based upon evaluations, rating. According to an embodiment, the evidence values are derived based upon probabilities.

Figure 16:
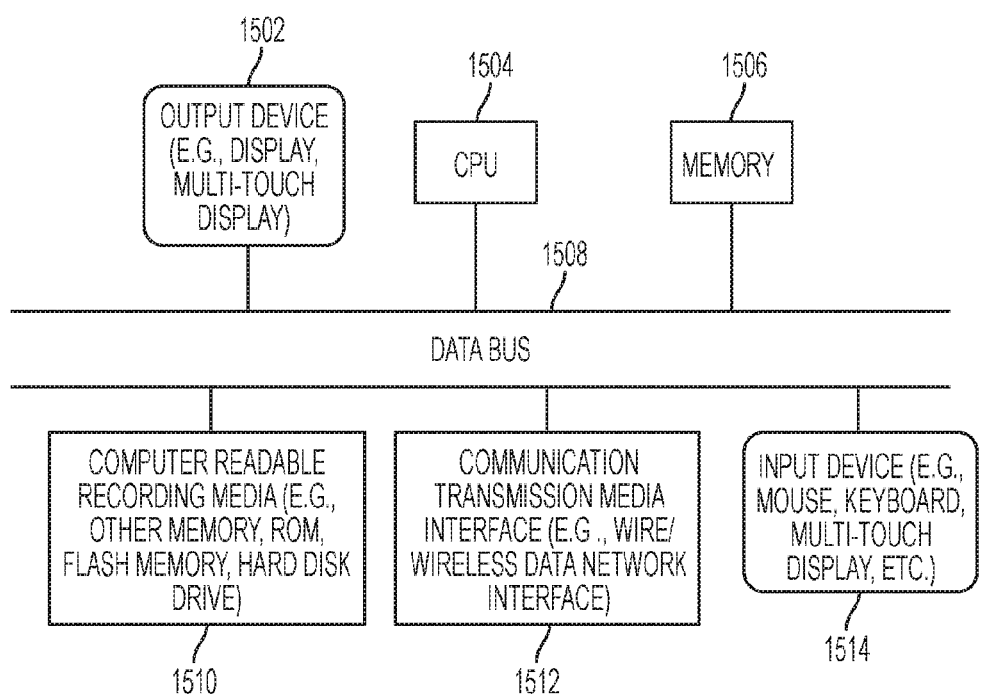
FIG. 16 is a functional block diagram of a computer, which is a machine, for implementing embodiments of the present invention.

FIG. 16 is a functional block diagram of a processing device, such as a computer (hardware computing/processing machine) for the embodiments of the invention, namely a computer 120 configured to execute functions of the augmented knowledge base computer system 100. In FIG. 16, the computer can be any computing device that can execute instructions to provide the described functions. Typically, the computer includes an input device 1514 (for example, a mouse, keyboard, multi-touch display screen, etc.), output device 1502 (for example, a display to display a user interface or output information, printer, etc). One or more computer controller(s) or processing cores 1504 (e.g., a hardware central processing unit) executes instructions (e.g., a computer program or software) that control the apparatus to perform operations. According to an aspect of an embodiment, one or more networked computer servers, each with a number of processing cores, execute the described operations.

Typically, a memory component 1506 stores the instructions for execution by the controller 1504. According to an aspect of an embodiment, the apparatus reads/writes/processes data of any computer readable recording or storage media 1510 and/or communication transmission media interface 1512. The communication transmission media interface is to data network with one or other machines (e.g., computers, a distributed network) to execute the described functions. The embodiments can be implemented via grid computing. The display 1502, the CPU 1504 (e.g., hardware logic circuitry based computer processor that processes instructions, namely software), the memory 1506, the computer readable media 1510, and the communication transmission media interface 1512 are in communication by one or more the data bus(es) 1508.

According to an aspect of the embodiments of the invention, any combinations of one or more of the described features, functions, operations, and/or benefits can be provided. A combination can be one or a plurality. The embodiments can be implemented as an apparatus (a machine) that includes hardware for performing the described features, functions, operations, and/or benefits, for example, hardware to execute instructions or software, for example, computing hardware (i.e., computing apparatus), such as (in a non-limiting example) any computer or computer processor that can store, receive, retrieve, process and/or output data and/or communicate (network) with other computers. According to an aspect of an embodiment, the described features, functions, operations, and/or benefits can be implemented by and/or use computing hardware and/or software. For example, the computer 120 and expert/and other sources devices 110, . . . , etc. can comprise a computing controller (CPU) (e.g., a hardware logic circuitry based computer processor that processes or executes instructions, namely software/program), computer readable media, transmission communication interface (network interface), input device, and/or an output device, for example, a display device, and which can be in communication among each other through one or more data communication buses. In addition, an apparatus can include one or more apparatuses in computer network communication with each other or other devices. In addition, a computer processor can refer to one or more computer processors in one or more apparatuses or any combinations of one or more computer processors and/or apparatuses. An aspect of an embodiment relates to causing and/or configuring one or more apparatuses and/or computer processors to execute the described operations. The results produced can be output to an output device, for example, displayed on the display. An apparatus or device refers to a physical machine that performs operations, for example, a computer (physical computing hardware or machinery) that implement or execute instructions, for example, by way of software, which is code executed by computing hardware, and/or by way of computing hardware (e.g., in circuitry, etc.), to achieve the functions or operations being described. The functions of embodiments described can be implemented in any type of apparatus that can execute instructions or code. More particularly, programming or configuring or causing an apparatus or device, for example, a computer, to execute the described functions of embodiments of the invention creates a new machine where in case of a computer a general purpose computer in effect becomes a special purpose computer once it is programmed or configured or caused to perform particular functions of the embodiments of the invention pursuant to instructions from program software. According to an aspect of an embodiment, configuring an apparatus, device, computer processor, refers to such apparatus, device or computer processor programmed or controlled by software to execute the described functions.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A method for a computer to represent a knowledge base, comprising:
   executing by the computer:
   creating objects in form E→A for the knowledge base, where A is a rule among rules in the knowledge base, and E is a set of evidences from the knowledge base that supports the rule A, so that the rule A is supportable by the set of evidences E;
   determining relationship constraints $\mathcal{C}_{K\,K}$ in form of relations among a plurality of sets of evidences E, including at least one or any combination of a subset relation or a disjoint relation among the plurality of sets of evidences E; and
   computing for a target rule L, a first composite object $\omega_1 = G_1 \rightarrow L_0$, the first composite object $\omega_1$ constructed from a combination of the objects E→A to create a composite sets of evidences $G_1$ subject to the relationship constraints $\mathcal{C}_{K\,K}$ which support a composite rule $L_0$, the composite rule $L_0$ being a combination of the rules implying the target rule L,
   the first composite object $\omega_1$ indicative by deductive reasoning of a first validity and/or a first plausibility value for the target rule L.

2. The method according to claim 1, wherein the computer further executes:
   creating a largest composite sets of evidences G according to a union of a plurality of composite sets of evidences $G_1$, subject to the relationship constraints $\mathcal{C}_{K\,K}$, which support the composite rule $L_0$; and
   computing a composite object $\omega_v$ indicative of a second validity value for target rule L.

3. The method according to claim 2, wherein the computer further executes:
   obtaining a set complement of the largest composite sets of evidences G that supports negation of the target rule L; and
   computing a composite object $\omega_p$ indicative of a second plausibility value for the target rule L.

4. The method according to claim 2,
   wherein E is a subset of set U of evidences in the knowledge base;
   the computer further executes adding a new object in form U→L', where the new object is a negated target rule L' supported by the U, to the knowledge base, to thereby provide an expanded knowledgebase; and
   the largest composite sets of evidences G is created from the expanded knowledgebase that supports a logical falsehood F created on basis of the negated target rule L', subject to the relationship constraints $\mathcal{C}_{K\,K}$ which support the composite rule $L_0$,
   to thereby compute the second validity value for the target rule L.

5. The method according to claim 3,
   wherein E is a subset of set U of evidences in the knowledge base;
   the computer further executes adding a new object in form U→L, where the new object is the target rule L supported by the U, to the knowledge base, to thereby provide an expanded knowledge base; and
   the largest composite sets of evidences G is created from the expanded knowledge base that supports a logical truth T created on basis of the target rule L, subject to the relationship constraints $\mathcal{C}_{K\,K}$, which support the composite rule $L_0$;
   to thereby compute the second plausibility value for the target rule L.

6. The method according to claim 1, wherein E is subset of set U of evidences in the knowledge base, so that the rule A is uncertain and/or incomplete,
   thereby the computed first composite object $\omega_1$ being indicative of the first validity and/or the first plausibility value for the target rule L according to the uncertain and/or incomplete rule A supported by the subset E.

7. The method according to claim 1, wherein the computer further executes:
   determining a complement of the first composite object $\omega'_1 = G_1' \rightarrow L'_0$, the complement of the first composite object $\omega_1' = G'_1 \rightarrow L'_0$ being a complement of the composite sets of evidences G' and a negation of the composite rule $L_0'$, subject to the relationship constraints $\mathcal{C}_{K\,K}$; and
   computing for the target rule L, a second composite object $\omega_2 = G_2 \rightarrow L_0$, the second computed composite object $\omega_2$ being indicative by inductive reasoning of a third validity and/or a third plausibility value for the target rule L.

8. The method according to claim 2, wherein the creating the largest composite sets of evidences G comprises:
   repeatedly combining two or more of evidences E of a composite sets of evidences $G_1$ by merging rules A and taking intersection of corresponding sets of evidences E, subject to the relationship constraints $\mathcal{C}_{K\,K}$ among the sets of evidences E.

9. The method according to claim 1, wherein the computer further executes:
mapping values to the plurality of sets of evidences E,
wherein the computing the first composite object $\omega_1$ includes computing the first validity and/or the first plausibility value by determining a value of the $G_1$ using the mapped values of the plurality of sets of evidences E, the first validity and/or the first plausibility value indicative of a strength of validity and/or plausibility for the target rule.

10. The method according to claim 1, wherein the computer further executes:
constructing a consistent higher order knowledge base according to different methods of removing and/or altering objects E→A in the knowledge base that are inconsistent with other objects E→A
wherein the creating the objects in the form E→A is for the consistent higher order knowledge base.

11. The method according to claim 1, wherein the knowledgebase is a Free-Form Data Base and the computer further executes:
converting relational data bases and/or deductive data bases to Free-Form Databases; and
applying the deductive reasoning to the converted Free-Form Databases.

12. The method according to claim 7, wherein the knowledgebase is a Free-Form Data Base and the computer further executes:
converting relational data bases and/or deductive data bases to Free-Form Databases; an
applying the inductive reasoning to the converted Free-Form Data Bases.

13. The method according to claim 9, wherein the mapping of the value to the set of evidences E further comprises:
extending a measure of the composite sets of evidences $G_1$, where a measure is a function which the values to the set of evidences E, by:
selecting the measure defined on the knowledge base which is probabilistic to filter anomalies associated with the deductive reasoning;
representing the relationship constraints $\omega_K$ among the plurality of sets of evidences E using directed and undirected graphs;
insuring that a graph representation of the relationship of constraints $\mathcal{C}_{K\,K}$ is admissible and compatible with the selected measure.
preprocessing the selected measure subject to the relationship constraints $\omega_K$ to obtain a new measure free of any relationship constraints; and
applying the new measure to the set of evidences E.

14. The method according to claim 1, wherein the relationship constraints $\mathcal{C}_{K\,K}$ are input.

15. At least one server, comprising:
a processor; and
a non-transitory computer readable storage medium configured to store objects in the form E→A, where A is a rule among rules in a knowledge base, and E is a set of evidence from the knowledge base that supports the rule A, so that the rule A is supportable by the set of evidences E, and to store instructions, which when executed by the processor, cause the processor to execute:
determining relationship constraints $\omega_K$ in form of relations among a plurality of sets of evidences E, including at least one or any combination of a subset relation or a disjoint relation among the plurality of sets of evidences E; and
computing for a target rule L, a first composite object $\omega=L_0$, the first composite object $\omega_1$ constructed from a combination of the objects E→A to create a composite sets of evidences $G_1$ subject to the relationship constraints $\omega_K$ which support a composite rule $L_0$, the composite rule $L_0$, the composite rule $L_0$ being a combination of the rules implying the target rule L,
the first composite object $\omega_1$ indicative by deductive reasoning of a first validity and/or a first plausibility value for the target rule L.

16. The at least one server according to claim 15, wherein the processor further executes:
determining a complement of the first composite object $\omega_1'=G'_1\to'_0$, the complement of the first composite object $\omega_1'=G'_0L'_0$ being a complement of the composite sets of evidences G' and a negation of the composite rule $L_0'$ subject to the relationship constraints $\mathcal{C}_{K\,K}$; and
computing for the target rule L, a second composite object $\omega_2=G_2\to L_0$, the second computed composite object $\omega_2$ being indicative by inductive reasoning of a second validity and/or a second plausibility value for the target rule L.

17. The at least one server according to claim 15, wherein the processor further executes:
creating a largest composite sets of evidences G according to a union of a plurality of composite sets of evidences $G_1$, subject to the relationship constraints $\mathcal{C}_{K\,K}$, which support the composite rule $L_0$; and
computing a composite object $\omega_v$, indicative of a third validity value for target rule L.

18. The at least one server according to claim 17, wherein the processor further executes:
obtaining a set complement of the largest composite sets of evidences G that supports negation of the target rule L; and
computing a composite object $\omega_p$ indicative of a third plausibility value for the target rule L.

* * * * *